(12) United States Patent
Lynch et al.

(10) Patent No.: US 8,230,990 B2
(45) Date of Patent: Jul. 31, 2012

(54) PARTS MANIPULATION METHOD AND APPARATUS

(75) Inventors: Kevin Lynch, Chicago, IL (US); Paul Umbanhowar, Evantston, IL (US)

(73) Assignee: Northwestern University, Evanston, IL (US)

( * ) Notice: Subject to any disclaimer, the term of this patent is extended or adjusted under 35 U.S.C. 154(b) by 466 days.

(21) Appl. No.: 11/724,607

(22) Filed: Mar. 15, 2007

(65) Prior Publication Data

US 2007/0221480 A1 Sep. 27, 2007

Related U.S. Application Data

(60) Provisional application No. 60/782,793, filed on Mar. 16, 2006.

(51) Int. Cl.
*B65G 27/00* (2006.01)
*B65G 27/32* (2006.01)
*B65G 27/16* (2006.01)

(52) U.S. Cl. ............... 198/752.1; 198/753; 198/759; 198/760; 198/771

(58) Field of Classification Search ............... 198/752.1, 198/753, 759, 760, 771
See application file for complete search history.

(56) References Cited

U.S. PATENT DOCUMENTS

| | | | |
|---|---|---|---|
| 3,217,864 A | 11/1965 | Allen et al. | |
| 4,874,998 A * | 10/1989 | Hollis, Jr. | 318/568.21 |
| 4,944,381 A | 7/1990 | Riley | |
| 4,946,586 A * | 8/1990 | Fletcher | 209/435 |
| 5,040,666 A | 8/1991 | Patel | |
| 5,053,687 A | 10/1991 | Merlet | 318/568.2 |
| 5,871,082 A * | 2/1999 | Kando et al. | 198/751 |
| 6,189,677 B1 | 2/2001 | Ruf et al. | 198/411 |
| 6,694,220 B1 | 2/2004 | Tanz | 700/226 |
| 6,854,585 B2 * | 2/2005 | Brooks et al. | 198/394 |
| 6,910,569 B2 | 6/2005 | Reznik et al. | 198/444 |
| 7,036,653 B2 * | 5/2006 | Reznik et al. | 198/401 |
| 2005/0126892 A9 | 6/2005 | Nuyen et al. | |
| 2005/0199472 A1 * | 9/2005 | Kato et al. | 198/750.8 |

FOREIGN PATENT DOCUMENTS

GB 2 259 900 3/1993

OTHER PUBLICATIONS

Jonathan Luntz and Hyungpil Moon, Distributed Manipulation with Passive Air Flow, International Conference on Intelligent Robots and Systems, Oct. 29-Nov. 3, 2001, pp. 195-196.*

Peter U. Frei, Roland Buchi, Markus Wiesendanger, Lorenz Ruf; Simultaneous Planar Transport of Multiple Objects on Individual Trajectories Using Friction Forces, pp. 5-6, Fig. 4.*

Dan Reznik, John Canny; A Flat Rigid Plate is a Universal Planar Manipulator, International Conference of Robotics and Automation, May 1998, pp. 1471, 1474, 1476.*

(Continued)

*Primary Examiner* — Gene Crawford
*Assistant Examiner* — Yolanda Jones
(74) *Attorney, Agent, or Firm* — Cook Alex Ltd.

(57) ABSTRACT

Method and apparatus for imparting movement to one or more articles includes placing the one or more articles on a surface of a support member and imparting vibratory motion to the support member by vibrating actutators connected to the support member wherein the vibratory motion includes at least a rotational vibratory component about one or more axes out-of-alignment with the gravity vector to produce effective force fields on the surface.

40 Claims, 16 Drawing Sheets

OTHER PUBLICATIONS

Jonahan Luntz and Hyungpil Moon, Distributed Manipulation and Passive Air Flow, Internation Conference on Intelligent Robots and Systems, pp. 195-196, Published Oct. 29-Nov. 3, 2001.*

Peter U. Frei, Roland Buchi, Markus Weisendanger, Lorenz Ruf; Simultaneous Planar Transport of Multiple Objects on Individual Trajectories Using Friction Forces, pp. 5-6, Fig. 4, Published 1999.*

Dan Reznik, John Canny; A Flat Rigid Plate is a Universal Planar Manipulator, International Conference on Robotics and Automation, pp. 1471, 1474, 1476, Published May 1998.*

K.L. Moore, "Iterative Learning Control for Determinisitic Systems," Springer-Verlaf, 1993.

P.J. Berkelman and R.L. Hollis, "Lorentz magnetic levitaion for haptic interaction:device design, function, and integration with simulated environments," International Journal of Robotics Research 9(7) :644-667, Jul. 2000.

R.-P. Berretty, et al. "Trap design for vibratory bowl feeders," IEEE International Conference on Robotics and Automation, 1999.

K.-F. Böhringer, et al., "Programmable vector fields for distribute manipulation, with applications to MEMS actuator arrays and vibratory parts feeders," International Journal of Robotics Research, 18(2):168-200, Feb. 1999.

K.-F. Böhringer, et al., "Sensorless manipulation using massively parallel microfabricated actuator arrays," IEEE International Conference on Robotics and Automation, 1994.

R.C. Brost, "Dynamic analysis of planar manipulation tasks," IEEE International Conference on Robotics and Automation, pp. 2247-2254, 1992.

U.S. Appl. No. 60/782,793, filed Mar. 2006.

M. Caine, "The design of shape interactions using motion constraints," IEEE International Conference on Robotics and Automation, pp. 366-371, 1994.

M.G. Coutinho, et al., "A general theory for positioning and orienting 2D polygonal or curved parts using intelligent motion surfaces," IEEE International Conference on Robotics and Automation pp. 856-862, 1998.

P.U. Frei, "An intellegent vibratory conveyor for the individual object transportation in two dimensions," IEEE/RSJ International Conference on Intellegent Robots and Systems, pp. 1832-1837, 2002.

B.A. Grzybowski, et al., "Electrostatic self-assembly of macroscopic crystals using contact electrification," Nature Materials, 2:241-245, 2003.

R.L. Hollis, et al., "A six-degree-of-freedom magnetically levitated variable compliance fine-motion wrist: design, modeling, and control," IEEE Transactions on Robotics and Automation 7(3):320-332, Jun. 1991.

S. Konoshi and H. Fujita, "A conveyance system using air flow based on the concept of disturbed micro motion systems," Journal of Microelectromechanical systems, 3(2):54-58, 1994.

S. Kota, et al., "Design and application of compliant mechanisms for surgical tools," Journal of Biomechanical Engineering, 127(6):981-989, 2005.

Z. Kowalik, et al., "Self-reanimating chaos in the bouncing ball system," Phys.Rev., 37:4016, 1988.

D.J. Kriegman, "Let them fall where they may: Capture regions of curved 3D objects," IEEE International Conference on Robotics and Automation, 1994.

J. Krishnasamy, et al., "Mechanics of vibration-assisted entrapmentwith application to design," In IEEE International Conference on Robotics and Automation, pp. 838-845, 1996.

S. Lenci and G. Rega, "Heteroclinic bifurcations and optimal control in the nonlinear rocking dynamics of generic and slender rigid blocks," Int. J. Bifurcation and Chaos, 15(6):1901-1918, 2005.

J. Luntz, et al., "Distributed manipulation with passive air flow," In IEEE/RSJ International Conference on Intellegent Robots and Systems, 2001.

J.E. Luntz, et al.,"Distributed manipulation using discrete actuator arrays," International Journal of Robotics Research, 20(7), Jul. 2001.

F. Melo, et al., "Hexagons, kinks, and disorder in oscillated granular layers," Phys. Rev. Lett., 75:3838-3841, 1995.

B. Mirtich, et al., "Part pose statistics: Estimators and experiments," IEEE Transactions on Robotics and Automations, 15(5):849-857, Oct.1999.

H. Moon, and J. Luntz, "Distributed manipulation by superposition of logarithmic-radial potential fields," In IEEE International Conference on Robotics and Automation, 2002.

T. Murphey and J. Burdick, "Feedback control for distributed manipulation systems that involve mechanical contacts," International Journal of Robotics Research, 23(7):763-781, Jul. 2004.

T.D. Murphry and J.W. Burdick, "On the stability and design of distributed manipulation control systems," In IEEE International Conference on Robotics and Automation, 2001.

A.E. Quaid, "A miniature mobile parts feeder: Operating principles and simulation results," In IEEE International Conference on Robotics and Automation, pp. 2221-2226, 1999.

D. Reznik and J. Canny, "The Coulomb pump: a novel parts feeding method using a horizontally vibrating suface," In IEEE International Conference on Robotics and Automation, pp. 869-874, 1998.

D. Reznik and J. Canny, "A flat rigid plate is a universal planar manipulator," In IEEE International Conference on Robotics and Automation, pp. 1471-1477, 1998.

D. Reznik and J. Canny, "C'mon part, do the local motion!" In IEEE International Conference on Robotics and Automation, pp. 2235-2242, 2001.

J. Selig and J. Dai, "Dynamics of vibratory bowl feeders," In IEEE International Conference on Robotics and Automation, pp. 3299-3304, 2005.

A. Sudsang and L.E. Kavraki, "A geometric approach to designing a programmable force field with a unique stable equilibrium for parts in the plane," In IEEE International Conference on Robotics and Automation, 2001.

F. Takens, "Detecting strange attractors in turbulence," In D.A. Rand and L.S. Young, editors, Dynamical Systems and Turbulence, vol. 898 of Lecture Notes in Mathematics, pp. 366-381, Spinger, 1981.

N.B. Tufillaro and A.M. Albano, "Chaotic dynamics of a bouncing ball," Am. J., Phys., 54:939, 1986.

P. Umbanhowar and K.M. Lynch, "Optimal vibratory stick-slip transport," 2006. Submitted to IEEE Transactions on Automation Science and Engineering, 2006.

K. Varsos, et al., "Generation of quadratic potential force fields from flow fields for distributed manipulation," In IEEE Transactions on Robotics, to appear, Feb. 2006.

L.N. Virgin, et al., "Transient motion and overturning of a rocking block on a seesawing foundation," J.Sound and Vibration, 191:177-187, 1996.

L.L. Howell, "Compliant Mechanisms," John Wiley and Sons, Inc., ISBN 0-471-38478-X , Jul. 25, 2001.

P.J. Berkelman and R.L. Hollis, "Lorentz magnetic levitaion for haptic interaction:device design, function, and integration with simulated environments," International Journal of Robotics Research 9(7):644-667, Jul. 2000.

K.Böhringer, et al., "Distributed robotic manipulation: Experiments in minimalism," International Symposium on Experimental Robotics, 1995.

K.-F. Böhringer, et al., "Algorithms for sensorless manipulation using a vibrating surface," Algorithmica, 16:389-429, 2000.

K.-F. Böhringer, et al., Sensorless manipulation using transverse vibrations of a plate. IEEE International Conference on Robotics and Automation, pp. 1989-1996, 1995.

K.-F. Böhringer and B.R. Donald, "Algorithmic MEMS" in P. Agarwal, L. Kavraki, and M.T. Mason, editors, Robotics: The Algorithmic Perspective, A.K. Peters, Natick, MA, 1998.

K.-F. Böhringer, et al., "A single universal force field can uniquely orient non-symmetric parts," International Symposium on Robotics Research, pp. 395-402. Springer, 1999.

K.-F. Böhringer, et al., "What programmable vector fields can (and cannot) do: Force field algorithms for MEMS and vibratory plate parts feeders," IEEE International Conference on Robotics and Automation, pp. 822-829, 1996, vol. (18).

G.Boothroyd, "Assembly Automation and Product Design," Marcel Deefer, 1992.

E.F.F. Chladni, "Entdeckungen über die Theorie des Klanges," Erben and Reich, Leipzig, 1787, Published 1787.

W.T. Fielder, et al. "Experiments and simulation of overturning of an asymmetric rocking block on an oscillating foundation," Eur.J.Mech. A/Solids, 16:905-923, 1997.

P.U. Frei, et al, "Simultaneous planar trasport of multiple objects on individual trajectories using friction forces," K.F. Böhringer and H. Choset, editors, Disturbed Manipulation, pp. 49-64. Kluwer Academic Publishers, 2000.

H. Hitakawa, "Advanced parts orientation system has wide application," Assembly Automation, 8(3):147-150, 1998.

J. Joo, et al., "Topological synthesis of compliant mechanisms using linear beam elements," Mechanics and Structures of Machines, 28(4):245-280, 2000.

F. Lamiraux, et al., "Positioning symmetric and non-symmetric parts using radial and constant force fields," In B.R. Donald, K.M. Lynch and D. Rus, editors, Algorithmic and Computational Robotics: New Directions, A.K. Peters, Natick, MA, 2000.

J.E.Luntz, et al.,"Discrete Actuator Array Vectorfield Design for Distributed Manipulation", In IEEE International Conference on Robots and Automation, 1999.

K.M. Lynch and M.T. Mason, "Stable puching:Mechanics, controllability, and planning," International Journal of Robotics Research, 15(6):533-556, Dec. 1996.

M.T. Mason, Mechanics of Robotic Manipulation, MIT Press, 2001.

J.P. Merlet, "Direct kinematics and assembly modes of parallel manipulators," International Journal of Robotics Research, 11:150-162, 1992.

B. Mirtich, et al., "Part pose statistics: Estimators and experiments," IEEE Transactions on Robotics and Automations, 15(5):849-857, Oct. 1999.

M. Moll and M.A. Erdmann, "Manipulation of pose distributions," in B.R. Donald, K.M. Lynch and D. Rus, editors, Algorithmic and Computational Robotics:New Directions. A.K. Peters, Natick, M.A., 2000.

H. Moon, "Distributed manipulation using naturally existing force fields," PhD thesis, University of Michigan, 2005.

N. Packard, et al., "Geometry from a time series," Phys. Res. Lett., 45:712-715, 1980.

D. Reznik, et al., "Building a universal planar manipulator," In K.F. Böhringer and H. Choset, editors, Distributed Manipulation, pp. 147-171, Kluwer Academic Publishers, 2000.

P. Song, et al., "A two-point boundary-value approach for planning manipulation tasks," in Robotics Science and Systems, 2005.

P. Song, et al., "Design of part feeding and assembly processes with dynamics," In IEEE International Conference on Robotics and Automation, 2004.

P. Umbanhowar and K.M. Lynch, "Optimal vibratory stick-slip transport," 2006. Submitted to IEEE Transactions on Automation Science and Engineering.

P. Wolfsteiner and F. Pfeiffer, "Dynamics of a vibratory feeder," In ASME Design Engineering Technical Conferences, 1997.

M.Yim, et al., "Two approaches to distributed manipulation," In K.F. Böhringer and H. Choset, editors, Distributed Manipulation, pp. 237-261, Kluwer Academic Publishers, 2000.

* cited by examiner

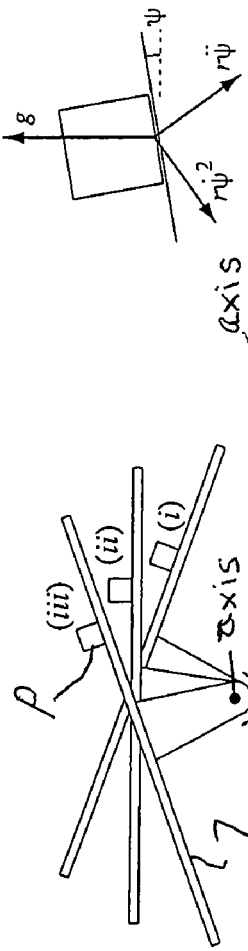
Figure 3A
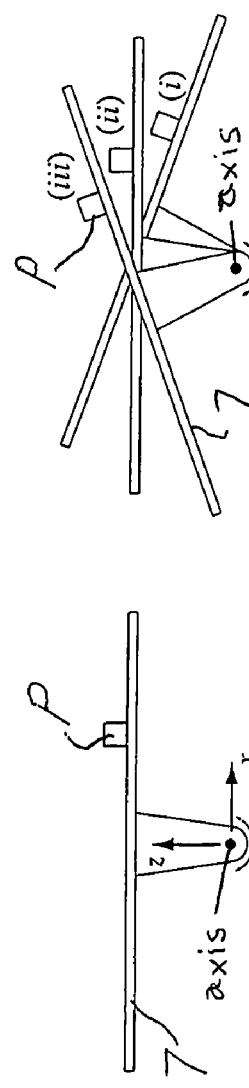
Figure 3D1
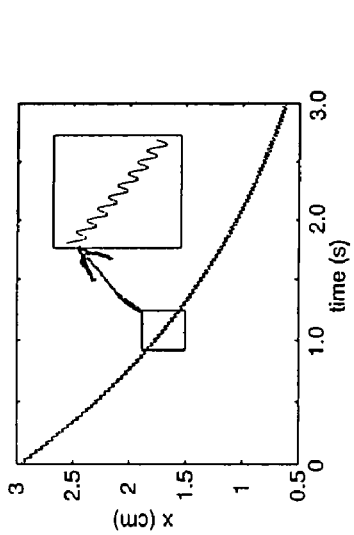
Figure 3B
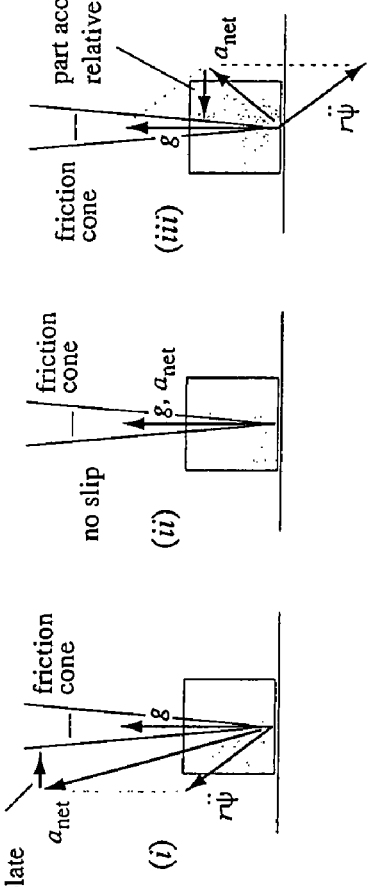
Figure 3D2
Figure 3D3
Figure 3C
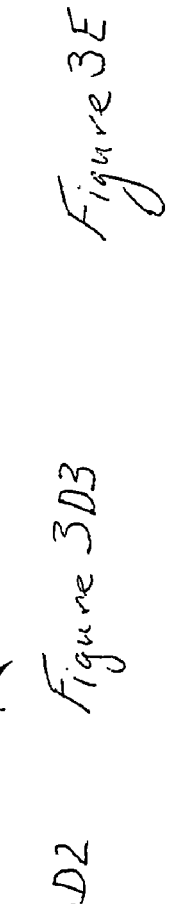
Figure 3E

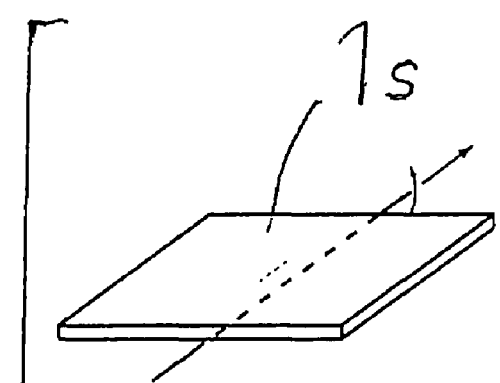
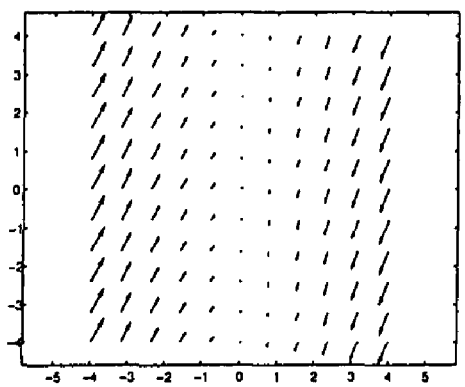
$k = (0,1,0)$
$h = (0,0,-5)$
$\psi(t) = -\psi_0 \cos \omega t + \psi_0$
$d(t) = -d_0 \cos \omega t + d_0$
SkewLineSink
Figure 5C
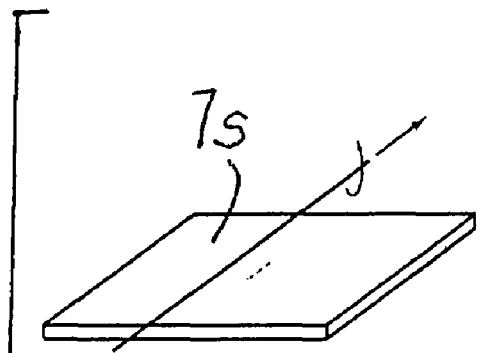
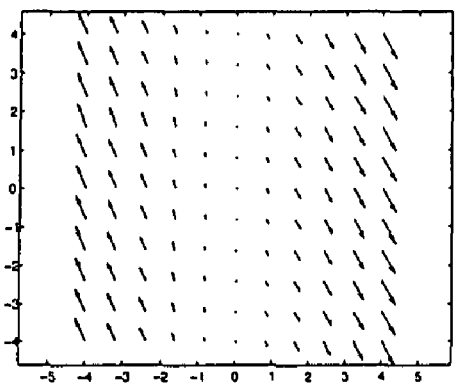
$k = (0,1,0)$
$h = (0,0,5)$
$\psi(t) = -\psi_0 \cos \omega t + \psi_0$
$d(t) = -d_0 \cos \omega t + d_0$
SkewLineSource
Figure 5D

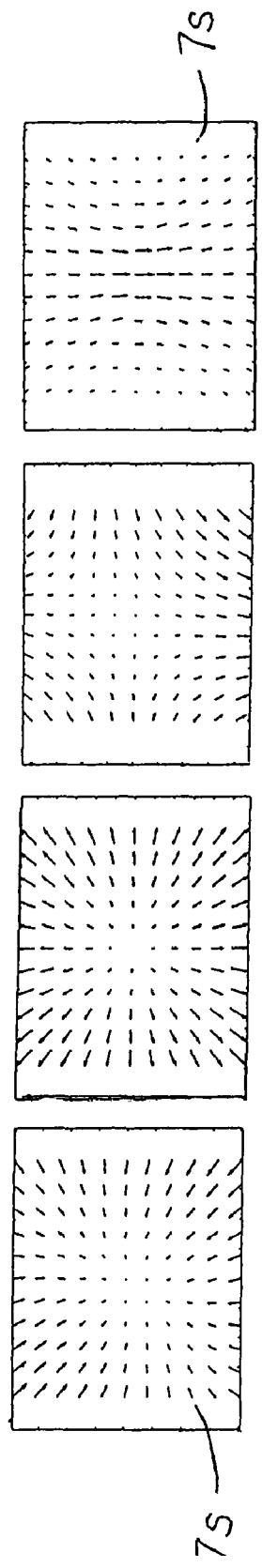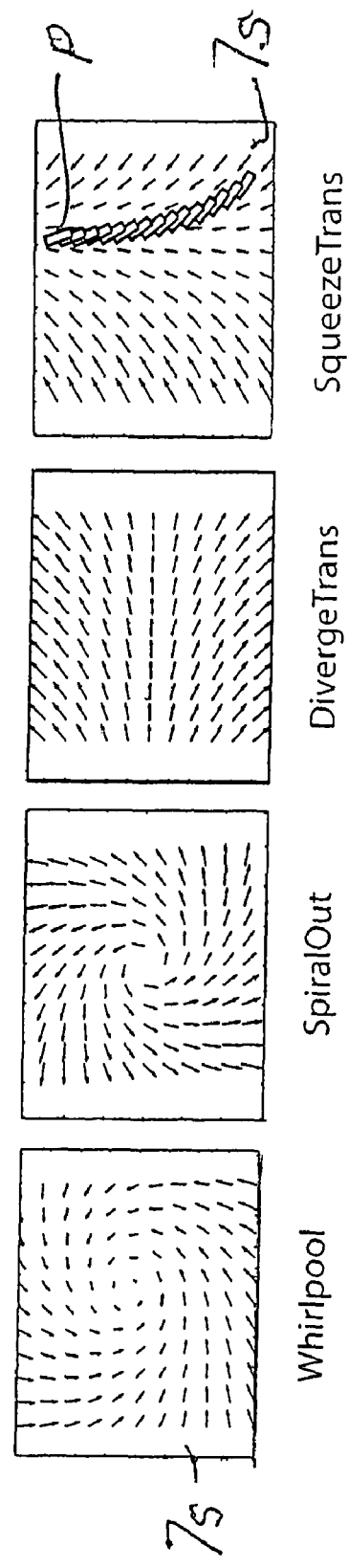

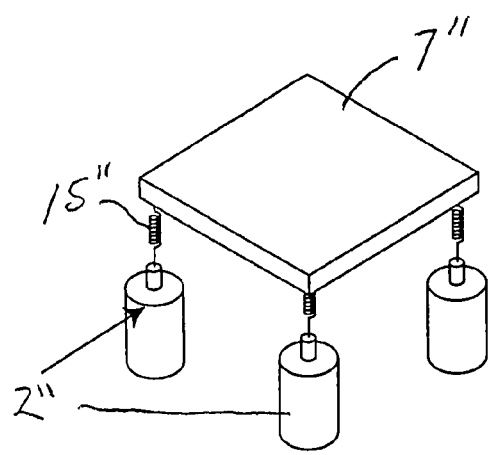
Figure 12A1
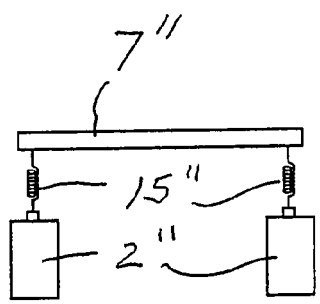
Figure 12A2
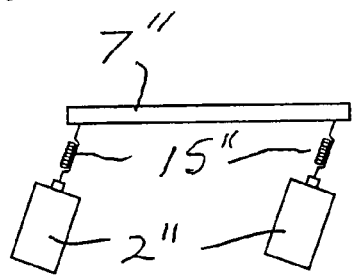
Figure 12B1
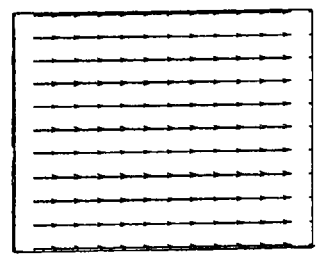
Figure 12B2

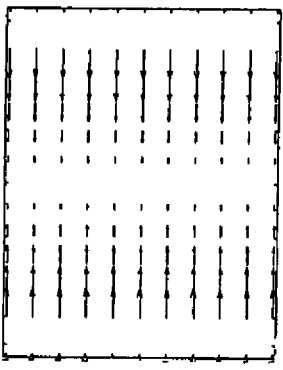
Figure 12C2
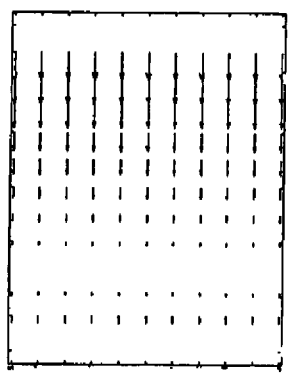
Figure 12C3
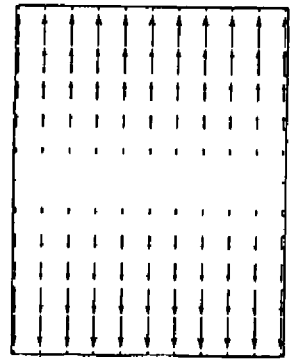
Figure 12D2
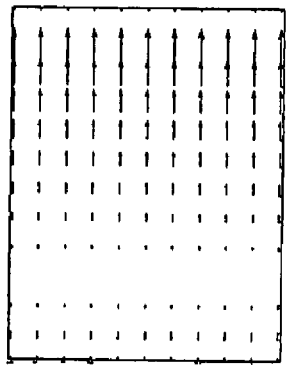
Figure 12D3
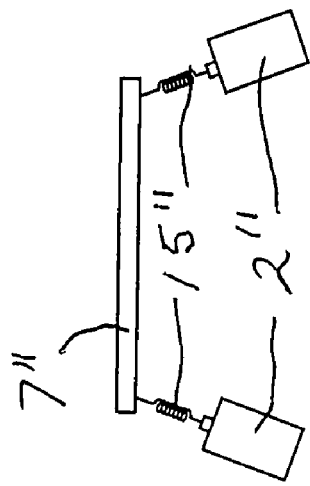
Figure 12C1
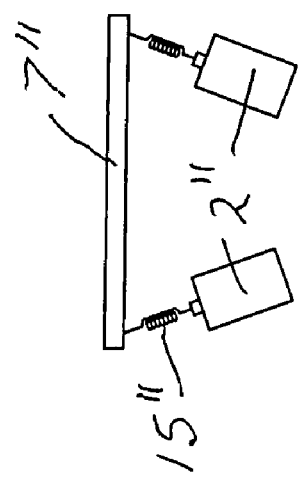
Figure 12D1

PARTS MANIPULATION METHOD AND APPARATUS

This application claims priority and benefits of provisional application Ser. No. 60/782,793 filed Mar. 16, 2006, the entire disclosure of which is incorporated herein by reference.

CONTRACTUAL ORIGIN OF THE INVENTION

This invention was supported in part by funding from the Federal Government through the National Science Foundation Grant/Contract IIS-0308224. The Government may have certain rights in the invention.

FIELD OF THE INVENTION

The present invention relates to method and apparatus for controlling movement of parts (articles) using force fields established on the parts' support surface by controlled vibration thereof.

BACKGROUND OF THE INVENTION

A number of different vibratory devices already exist for industrial applications such as parts feeding. Perhaps the most common industrial vibratory device is the bowl feeder, which uses vibration to advance parts up a helical track in the interior of a bowl while wipers and cutouts reorient or reject incorrectly oriented parts. The more recent Sony APOS parts orienting system uses a tray of holes approximately shaped like the negative of the part. The vibratory driving is co-designed with the hole shape to capture parts that are correctly oriented in the hole but to eject parts that are incorrectly oriented in the hole. Parts not captured in holes wash over the tray and fall into a recirculation bin, eventually to be lifted back to the top of the tray and dumped over it again, until a full tray of parts is obtained.

U.S. Pat. No. 6,189,677 describes a device, initially developed for chocolates packaging, that uses a planar array of many vibratory cells to create a flexible conveyor. Each cell vibrates vertically while moving in small circles in the horizontal plane. The phasing of these motions determines the net force applied to parts in the cell, and virtual force fields can be designed by setting these phases such that the force directions generally vary among the cells. This system is related to research in creating planar arrays of "motion pixels" for distributed manipulation. These motion pixels may consist of rolling wheels, individual vibrating plates, vibrating MEMS elements, or air jets. These two-dimensional arrays of motion pixels create force fields to manipulate parts resting on top of the array. While these devices offer great flexibility, they require a large number of individually-controllable actuators.

Other physical effects have been explored for planar manipulation using fewer actuators, such as air flow with a small number of sinks and vertical vibration of a flexible plate. Nodes in a flexible vibrating plate can be visualized via classical Chladni patterns of granular materials on the plate.

The possibility of such systems has inspired the study of planar force fields for eliminating uncertainty in the configuration of a two-dimensional planar part. Force fields are integrated over the area of the part, and the part is at equilibrium when the resultant forces and torques are zero. For a part with no rotational symmetry, force fields have been derived that result in a unique globally-attractive part equilibrium.

Reznik and Canny have shown that vibratory motions of a flat horizontal part support plate, using only rotations and translations in a horizontal plane, can generate frictional force fields on the surface of the plate. These can be used to move parts on the plate on a variety of different trajectories as described by Reznik and Canny in "A flat rigid plate is a universal planar manipulator," IEEE International Conference on Robotics and Automation, pages 1471-1477, 1998; "C'mon part, do the local motion!," IEEE International Conference on Robotics and Automation, pages 2235-2242, 2001; and "Building a universal manipulator," Distributed Manipulation, pages 147-171, Kluwer Academic Publishers, 2000.

As a result of the in-the-horizontal-plane nature of the plate motions, the force fields of Reznik and Canny are restricted to be divergence-free, however. That is, for any area of the plate, the force field flow into the area equals the flow out of the area. This precludes the possibility of sources and sinks in the field, and therefore these fields cannot be used for sensorless manipulation.

SUMMARY OF THE INVENTION

The present invention provides method and apparatus for imparting movement to one or more parts (articles) wherein a part support surface is subjected to periodic (vibratory) motion, including rotational motion out of the horizontal plane, to generate one or more force fields that impart motion to the parts.

Practice of an embodiment of the present invention involves placing one or more parts on a support surface of a support member and imparting vibratory rotation motion to the support member, wherein the vibratory motion includes at least a rotational vibratory component about one or more axes not aligned (out-of-alignment) with the gravity vector. The vibratory rotation motion imparts to the support surface an out-of-the-horizontal-plane motion that alters effective gravity at different locations on the surface in a position- and time-dependent manner.

Practice of another embodiment of the present invention involves combinations of vibratory in-plane translation and/or rotation motion primitives with the aforementioned rotational vibratory component about one or more axes not aligned with the gravity vector. Various combinations of motions can be imparted concurrently and/or in sequence to produce a large class or family of different force fields on the support surface to which the one or more parts are subjected. For purposes of illustration and not limitation, the combination of motions can be employed to produce a force field having a "point" sink or source, a force field having a linear or skewed linear sink, a linear or skewed linear source, a spiral-in (whirlpool) or spiral-out force field, a saddle-shaped force field, a force field that diverges or converges along an axis, and combinations thereof. These force fields arise due to parts sliding on the support surface. Furthermore, the present invention encompasses the use of vibratory impacts to create virtual potential wells to capture a part in a particular configuration (position and orientation) or set of configurations.

The present invention can be practiced for a variety of parts sorting, singulation, feeding, and transport applications at macro and mesoscopic scales. For example, for purposes of illustration and not limitation, the present invention can be used to perform functions such as planar transport of parts along a linear direction, planar transport of parts along designable vector fields (generalizing the linear transport mentioned above), sensorless planar transport of parts with simultaneous alignment, sensorless sorting of different parts, sensorless elimination of configuration uncertainty of a part by creating virtual potential wells, and vision-based control of the individual trajectories of parts on the plate. These functions can be varied or controlled by programming and/or selecting of particular motions of the parts' support surface. Some of these functions are not possible by any current vibratory device. Others are only possible by using a planar array of many actuators, or by addition of special-purpose fixtures.

These and other uses and advantages of the present invention will become apparent from the following description of the drawings taken with the following detailed description of the invention.

DESCRIPTION OF THE DRAWINGS

FIGS. 3A and 3B schematically illustrate apparatus for imparting vibratory rotation motion to a support plate wherein the vibratory motion includes a rotational vibratory component about an axis not aligned with the gravity vector. The vibratory rotation motion is imparted by vibrating a support plate about an axis of a rotation shaft arranged in a manner similar to FIG. 4A.

FIG. 3C illustrates the acceleration components of a point on the support plate wherein the acceleration components include a centripetal component and a component due to angular acceleration.

FIGS. 3D1, 3D2, and 3D3 show the accelerations of the support plate and the part at positions (i), (ii), and (iii) of FIG. 3B.

FIG. 3E shows the motion of the part in FIGS. 3A and 3B as the support plate vibrates.

FIGS. 5A through 5H illustrate respective views of the horizontal support plate having different motion primitives imparted thereto to generate the particular force fields shown (in plan) directly below the view of the support plate.

FIGS. 6A through 6H illustrate average force fields established by rapid switching over time among motion primitives in FIGS. 5A through 5H.

FIGS. 12A1, 12A2, 12B1, 12C1, and 12D1 illustrate 2DOF embodiments of the invention having only two independently-controlled linear actuators, while FIGS. 12B2; 12C2, 12C3; and 12D2, 12D3 illustrate several frictional force fields that can be created by the embodiment.

DESCRIPTION OF THE INVENTION

The present invention provides in an embodiment a method and apparatus for imparting movement to one or more parts (articles) on a part support surface wherein the part support surface is subjected to small-displacement periodic (vibratory) motion in one or more degrees of freedom, including rotational motion about one or more axes not aligned with the gravity vector. The invention can be practiced in connection with one or more articles which can include, but are not limited to, any type of manufacturing, assembly or other part or component, parts in bulk (e.g. screws or other fasteners in bulk), bulk particulate or granular material, or any other body or bodies made of any material.

Figure 1:
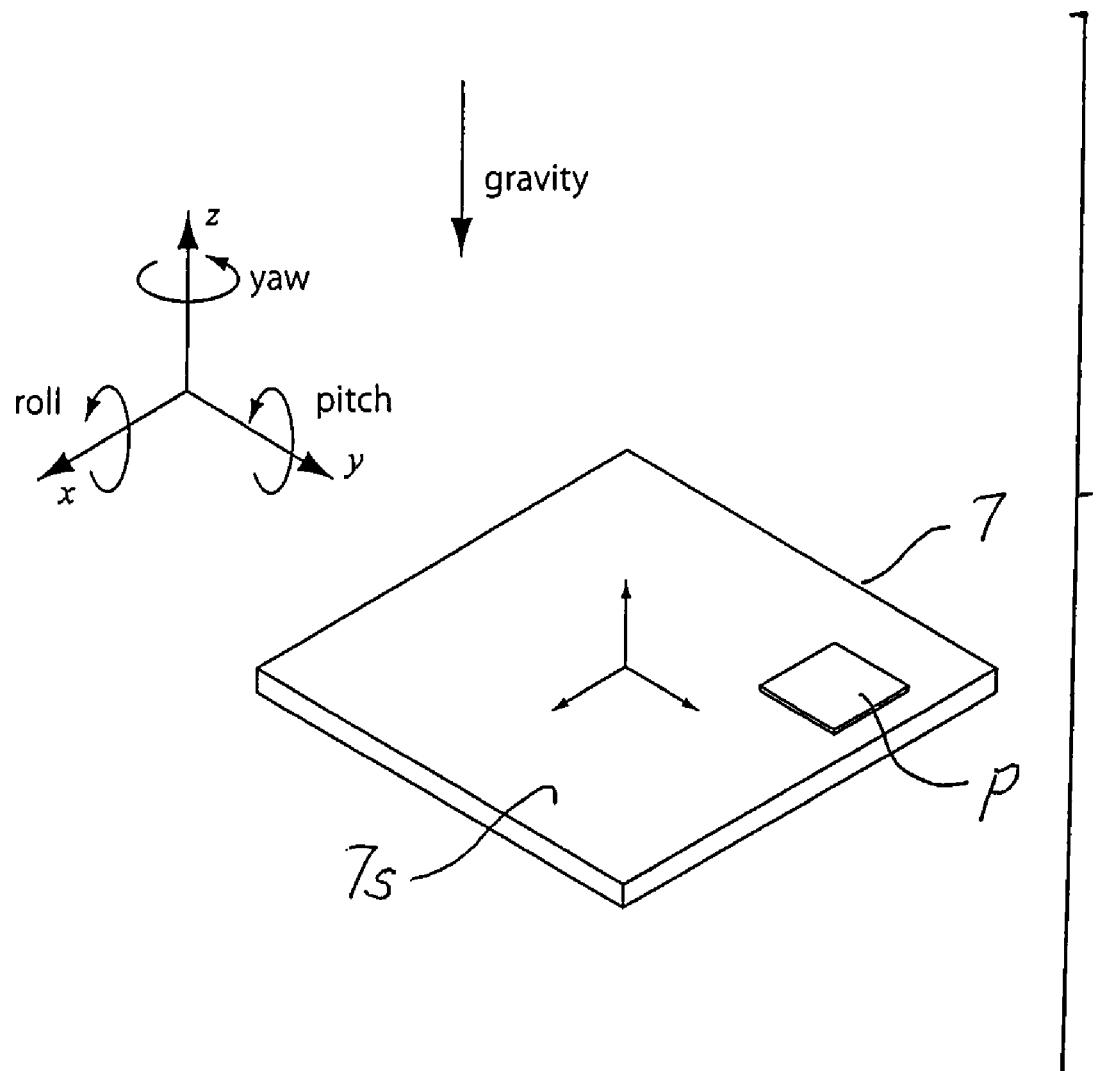
FIG. 1 illustrates a stationary "world" coordinate frame, an illustrative part support surface with an attached coordinate frame, and a part resting on the surface. The configuration of the plate is described by the (x,y,z) location of its coordinate frame in the stationary frame and its roll, pitch, and yaw in the stationary frame.

FIG. 1 illustrates a stationary coordinate frame that will be used throughout the description of the invention. The z-axis points opposite the direction of gravity, and the x- and y-axes are in a horizontal plane. Rotation about the x-, y-, and z-axes are denoted roll, pitch, and yaw, respectively. FIG. 1 also illustrates an example support surface 7s on a simple flate plate member 7 as well as a sample part P on the plate member 7. A second coordinate frame is rigidly attached to the moving support surface 7s. The position of the support surface 7s is given by the (x,y,z) location of the origin of this frame relative to the stationary frame, and the orientation is given by the (roll, pitch, yaw) of the surface's axes relative to the stationary frame. The vibratory motions employed in the invention cause the roll and/or pitch of the support surface 7s to change with time. (Many support surface motions also involve motion in one or more of the x, y, z, and yaw directions.) In other words, the support surface's motion includes rotations that are not simply about an axis aligned with the gravity vector. Such motions are called "motion with nonzero pitch or roll."

Figure 2A:
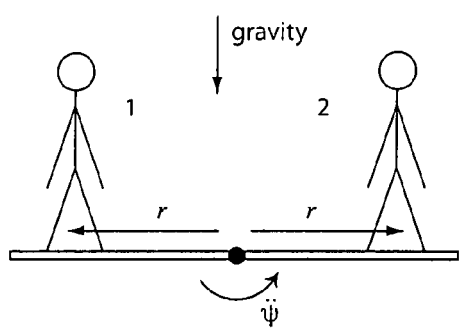
FIGS. 2A and 2B show two people standing on a platform rotating with angular acceleration $\dot{\psi}$. Person 1 experiences a reduced effective gravity due to the rotation, while person 2 experiences an increased effective gravity.
Figure 2B:
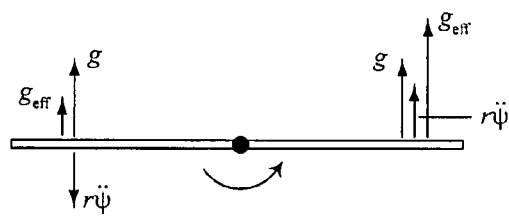

The effect of vibratory motion with nonzero pitch or roll is to change the "effective gravitational force" felt by a part on the surface. As a simple example, when an elevator accelerates downward, all occupants briefly feel reduced gravity (reduced force at the contact between the feet and the floor). When an elevator accelerates upward, all occupants briefly feel increased gravity. On the other hand, if the elevator accelerates rotationally about a fixed axis in the plane of the floor of the elevator, as shown in FIG. 2A, person 1 feels decreased gravity while person 2 feels increased gravity. Each person stands a distance r from the pivot axis (person 1 to the left and person 2 to the right) and the floor rotates from rest with angular acceleration $\ddot{\psi}$. The effective gravity, or $g_{eff}$, felt by each person can be calculated by summing the actual gravity g (drawn as an upward vector acting on each person, to represent the floor's acceleration into the person due to gravity) with the acceleration component $r\ddot{\psi}$ due to the motion of the floor. FIG. 2B shows that the component $r\ddot{\psi}$ partially cancels g at person 1's location, so person 1 feels reduced gravity, while the component $r\ddot{\psi}$ adds to g at person 2's location, so person 2 feels increased gravity. If the motion is periodic, e.g., a low-amplitude sinusoidal motion, each person feels periodic (time-varying) effective gravity. Thus, motion with nonzero pitch or roll creates an effective gravitational force that is both position-dependent (person 1 and person 2 feel different forces) and time-dependent.

The present invention describes methods and apparatus for using vibratory motion with nonzero pitch and/or roll (creating position- and time-dependent effective gravity) to create a broad class of controlled force fields to manipulate parts on the vibrating support surface. The primary forces influencing part motions are gravitational, inertial, frictional contact, and impact. Parts interact with the vibrating surface in two ways: by sliding over the surface (including rolling and stick-slip), and by impact. Impact occurs when downward surface accelerations exceed the gravitational acceleration, so that the part briefly loses contact with the surface before impacting later. While both regimes of interaction may occur simultaneously, each regime is described separately below for clarity. The remainder of this description is broken into three parts: vibratory manipulation of parts sliding on the support surface; vibratory manipulation of parts impacting with the support surface; and example apparatus embodying the methods.

Controlled Friction Force Fields: Vibratory Manipulation of Sliding Parts

A part sliding over a dry support surface experiences a friction force $f=\mu f_n$ in a direction opposing the motion of the part relative to the support surface, where $\mu$ is the friction coefficient between the part and the surface and $f_n$ is the normal force between the part and the surface. (The normal force is the support force perpendicular, or normal, to the plane of contact.) The normal force is expressed as $f_n=mg_{eff}$, where m is the mass of the part and $g_{eff}$ is the effective gravitational acceleration. The effective gravitational acceleration is reduced from g if the part is resting on a slope: $g_{eff}=g \cos \psi$, where $\psi$ is the angle of the slope with respect to horizontal. More relevant is the fact that $g_{eff}$ can be increased or decreased in a position-dependent way by accelerating the surface with nonzero pitch or roll. Controlled frictional forces are applied to parts on the surface by controlling the effective gravity $g_{eff}$ and the direction of sliding of the surface relative to the part.

1DOF Example

An illustrative one-degree-of-freedom (1DOF) embodiment of the present invention is shown in FIGS. 3A, 3B. In FIG. 3A, a part P is placed on a nominally horizontal support plate 7 which rotates about an axis below the plate in a gravitational field (g). The periodic vibratory motion has low maximum amplitude (0.3 degrees) at a frequency of 30 Hz. FIG. 3B shows three snapshots of the motion of the plate and the part thereon where the amount of rotation is exaggerated for clarity. FIG. 3C illustrates the acceleration components of the plate at its contact with the part P, including an upward acceleration g (this is equivalent to the part accelerating down into the plate at g), a centripetal component $r\dot{\psi}^2$ acting toward the rotation axis, and a linear acceleration $r\ddot{\psi}$, where r is the current distance from the rotation axis to the part P, $\psi$ is the angle of the plate, $\dot{\psi}$ is the angular velocity of the plate, and $\ddot{\psi}$ is the angular acceleration of the plate.

Due to the high-frequency, low-amplitude nature of the plate's motion, a good approximation is $\psi=\dot{\psi}=0$. With this approximation, FIG. 3D1 shows the plate's acceleration components in the frame of the part when the plate is at state (i) from FIG. 3B, i.e., at maximum clockwise rotation with maximum counterclockwise acceleration. The net acceleration of the plate relative to the stationary part P is $a_{net}$, as shown by vector summation of the g component and the $r\ddot{\psi}$ component in FIG. 3D1. The effective gravity $g_{eff}$ is large, as the $r\ddot{\psi}$ component has a significant upward component. The net acceleration $a_{net}$ lies to the left of the "friction cone," which bounds the accelerations that the part can achieve through contact with the plate. (This cone is given by lines at angles $\tan^{-1} \mu$ with respect to the vertical, where $\mu$ is the friction coefficient.) The part's acceleration therefore lies on the left edge of the friction cone, and the difference between this acceleration and the plate's acceleration is the slipping acceleration: the part begins slipping to the right relative to the plate. Similarly, in state (iii) in FIG. 3D3 (plate is at maximal counterclockwise rotation with maximum clockwise acceleration), the part begins slipping left on the plate, but at a greater acceleration. In this case, the effective gravity $g_{eff}$ is small, as the $r\ddot{\psi}$ component has a significant downward component. In state (ii) in FIG. 3D2 (plate is horizontal with zero acceleration), the net acceleration of the plate is inside the friction cone, so the part sticks to the plate as it moves.

The net result is shown in FIG. 3E. Because the part experiences greater acceleration to the left than to the right over the course of a cycle, it moves toward a point above the rotation axis. The plot shows the x-coordinate of the part over time as the plate rotates periodically. The inset shows the small-amplitude oscillation of the part as it converges to the center of the plate with decreasing average speed. This behavior was obtained using a dynamics simulation incorporating correct stick-slip frictional behavior and using a friction coefficient of $\mu=0.3$.

Figure 4A:
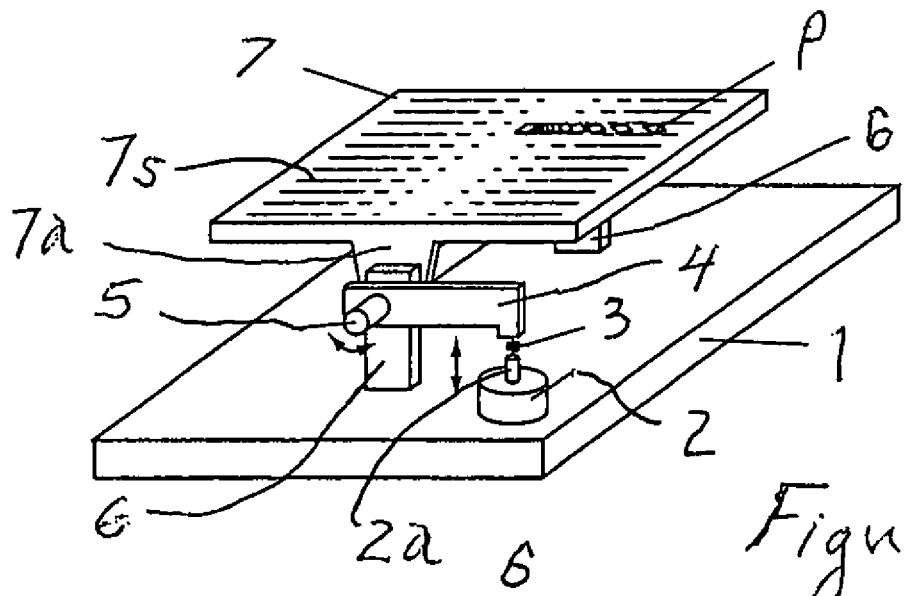
FIG. 4A is a view of an apparatus pursuant to an illustrative embodiment of the invention having 1DOF (one degree of freedom) of motion of the part support surface and capable of establishing a linear sink across the center of the part support surface.
Figure 4B:
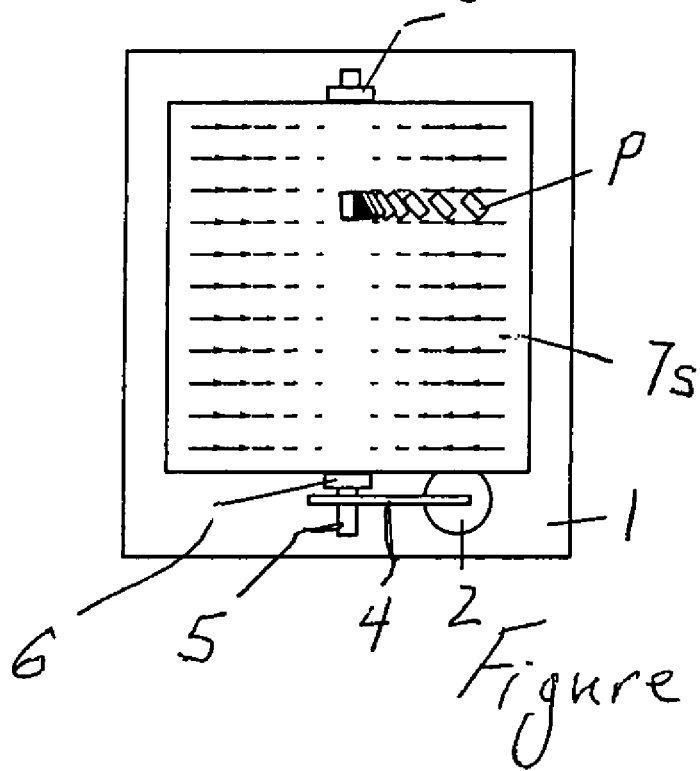
FIG. 4B is a plan view of the apparatus of FIG. 4A showing the linear sink established on the part surface by out-of-horizontal-plane motion of the support plate.

An apparatus demonstrating this behavior is shown in FIGS. 4A, 4B. (Other apparatus embodying the invention are described below.) A part P is shown resting on a horizontal, rigid support member shown as a support plate 7 that oscillates symmetrically about an axis below the surface 7s of the plate 7 as described below. The illustrative apparatus is shown including a stationary base plate 1 having fixed rotation bearing mounts 6 disposed thereon. A linear actuator 2 is disposed on the base plate 1 and can comprise a voice coil actuator for purposes of illustration and not limitation. The invention is not limited to linear voice coil actuators and can be practiced using other actuators permitting high-frequency, low-amplitude motions, including, but not limited to, rotational voice coils, piezoelectric actuators, pneumatic, and other electromagnetic actuators.

An optional laterally (side-to-side) compliant member 3 is disposed between the output shaft 2a of the linear acutator 2 and a lever arm 4 that is rigidly connected to the rotation shaft 5 mounted for rotation in the bearing mounts 6. The optional compliant member 3 may be provided to accommodate a small mismatch between the motion of the lever arm 4 in a circle about rotation shaft 5 and the linear motion of the linear actuator shaft 2a. The necessary compliance may exist naturally in the construction of the system, without requiring a separate element 3.

A substantially rigid support plate 7 is rigidly connected to the rotation shaft 5 by bottom flanges 7a (one shown) extending therefrom so that the plate 7 rotates with shaft 5. One or more parts P is/are disposed on the support surface 7s of the plate 7. The support plate 7 is considered substantially rigid in the sense that it does not exhibit flexural modes when vibratory motion is imparted thereto as described below. For purposes of illustration and not limitation, the suppport member is shown as a substantially rigid, horizontal flat plate on which the one or more parts (articles) are disposed. Although the support member 7 is illustrated as a substantially rigid, horizontal flat plate, the invention envisions use of other types of substantially rigid support members 7 that have a non-flat configuration that can be selected as desired to augment in some manner the force fields established by vibration of the support member 7.

In operation, the linear actuator 2 is energized to vibrate the support member 7. The linear actuator 2 is energized by receiving periodic electrical currents i(t) from a controller (see FIG. 11). The currents are sinusoidal in the example embodiment, but this is not a restriction. The output shaft 2a of the linear actuator 2 moves up and down with a periodic motion so as to cause the lever arm 4, rotation shaft 5, and plate 7 to rotate about an axis below the plate 7. The axis corresponds to the rotation axis of the rotation shaft 5.

A full dynamics simulation, including friction, was used to simulate the motion of parts on the support plate 7 as it rotates with low-amplitude, high-frequency motion, as in FIG. 3. The effect of the plate's motion can be represented as a force field as shown in FIG. 4B. A point part initially at rest on the plate experiences a time-averaged force as a function of its location, as indicated by the vectors in FIG. 4B. (Force fields are time-averaged because it is the net force over one or more cycles of the plate's periodic motion that is of interest, not the instantaneous force at any instant.) The force field is obtained via simulation of the full dynamics. In FIG. 4B, force vectors point to a center line above the rotation axis. The net result is that one or more parts on the plate converge to this line. This force field is called a "LineSink." A rigid part with extent can be treated as a collection of rigidly connected point parts, and the LineSink field causes the part to align with the sink line, as shown in the simulation of FIG. 4B.

The time-averaged force field for unit-mass point parts initially at rest is a function of the friction coefficient and the motion of the surface. This representation of the effect of vibratory motion is used for simplicity and illustration, although the invention is not limited to this illustration. For a part with planar extent, an at-rest force field describing all forces and torques acting on the part can be derived. A quasi-steady-state velocity fields for point parts and parts with planar extent can also be dervied. In general, the force experienced by a part is a function of its shape, mass distribution, initial velocity, friction coefficient, and motion of the plate.

For purposes of illustration and not limitation, the 1DOF apparatus of FIGS. 4A and 4B was built to have an aluminum support plate 7 having a thickness of 0.25 inches, a width of 9 inches, and a length of 9 inches. The axis of rotation of rotation shaft 5 was disposed 4 cm below the plate 7. A common bass speaker was used as voice coil actuator 2. A function (signal) generator provided a 30 Hz sinusoidal input signal to a stero amplifier which powered the voice coil. An accelerometer (not shown) mounted on the bottom of the support plate verified nearly sinusoidal rotational acceleration of the plate surface.

To test the theoretical LineSink prediction, we tested the motion of a part on the vibrating plate. The theory predicts the velocity of a part on the plate decreases linearly with its distance from the rotation axis. The test part comprised an aluminum disk with a diameter of 0.5 cm and thickness of 0.125 inches. It was initially placed at rest 9 cm from the axis of rotation of shaft 5 and allowed to accelerate inwards. Timing began when the center of the part was 6.5 cm from the axis. The time was recorded every 0.5 cm of travel between 6.5 cm and 1 cm. A strong linear relationship between the part location and the part velocity was observed based on ten trials under these conditions and fit mathematical predictions.

The 1DOF example demonstrates agreement between theory and experiment, and motivates further uses of vibratory motion with nonzero pitch and roll for vibratory sliding manipulation, as described below.

Embodiments

Apart from the simple motion described above, the invention envisions a broad set of support surface motions to generate a large class of useful force fields. The support surface motion may be any six-degree-of-freedom (x, y, z, roll, pitch, yaw) periodic motion profile, including nonzero roll and pitch, with low amplitude (typically millimeters or microns or less of linear motion, and typically on the order of a degree or less in rotation) and cycle time less than one second. The motion profile may be fixed or it may change under computer control. The support surface may be a flat plate or it may be shaped to modify the force fields generated by vibration. The surface may be largely horizontal or it may be inclined in gravity, to modify the effective force field. For purposes of illustration and not limitation, the case of a flat, largely horizontal support surface is discussed in detail below.

The set of all periodic six-degree-of-freedom trajectories is an infinite-dimensional set, so we choose a particular class of motions for the support surface 7 for purposes of illustration and not limitation. These are simple "screw" type motions, where the support surface translates along a screw axis while also rotating about the screw axis. The screw axis is given by a point h through which the screw axis passes, as well as the unit vector $k=(k_x, k_y, k_z)$ pointing in the direction of the screw axis. Both of these are specified in the stationary frame. The periodic motion of the plate is given by $\psi(t)$, the rotation about the axis as a function of time, and d(t), the translation along the axis. If d(t)=0, the motion is a pure rotation, and if $\psi(t)=0$, the motion is a pure translation.

Figures 5A, 5B:
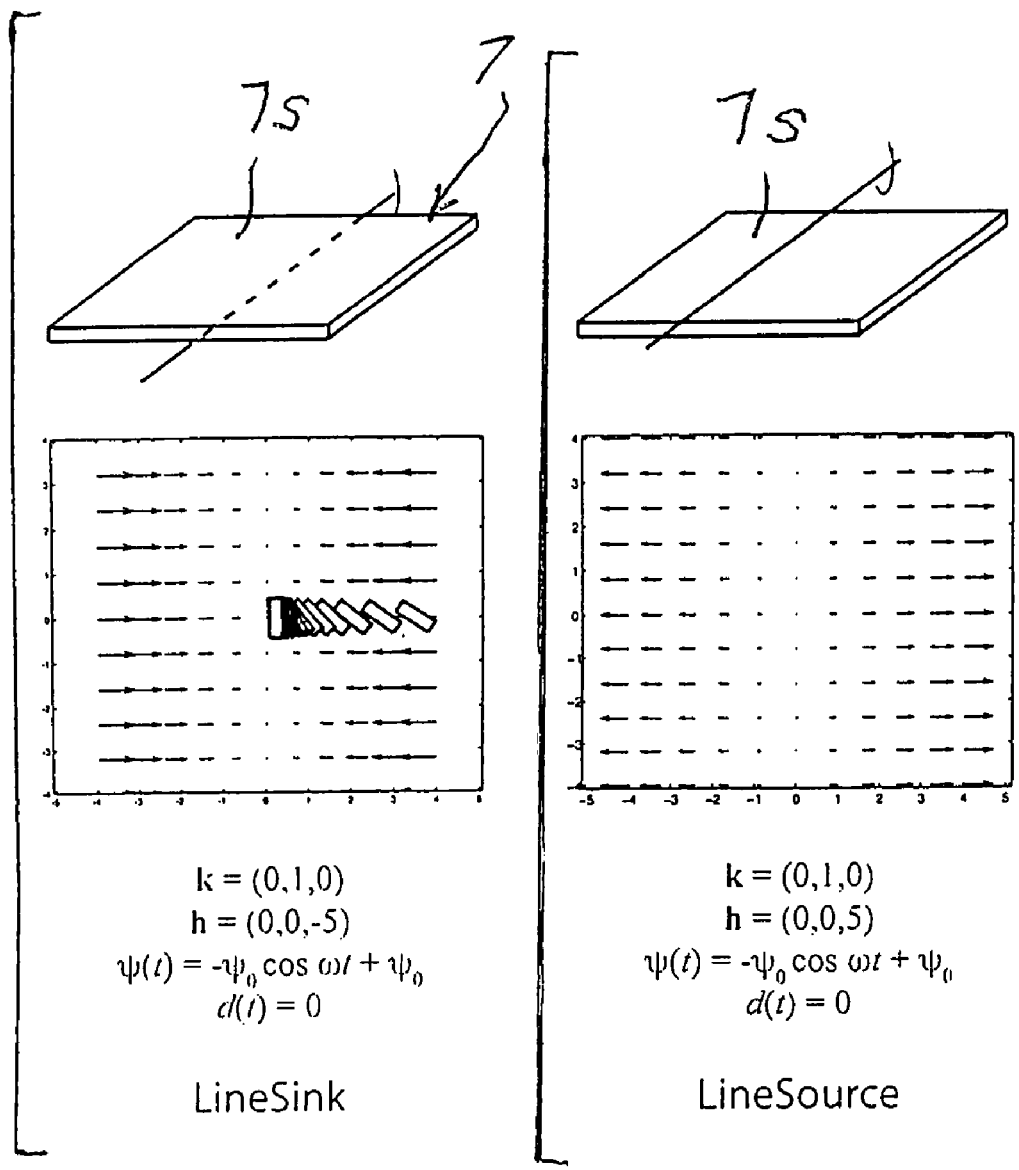
Figures 5E, 5F:
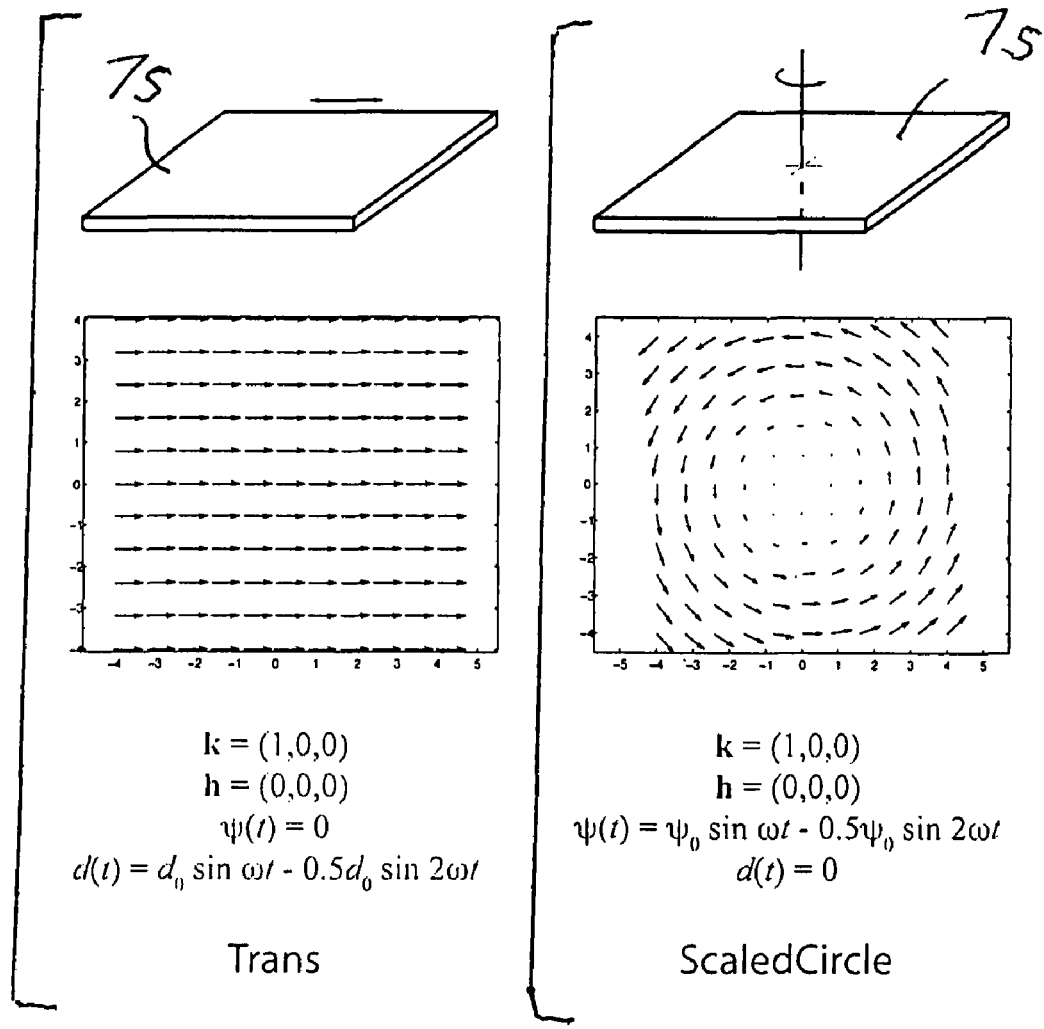
Figures 5G, 5H:
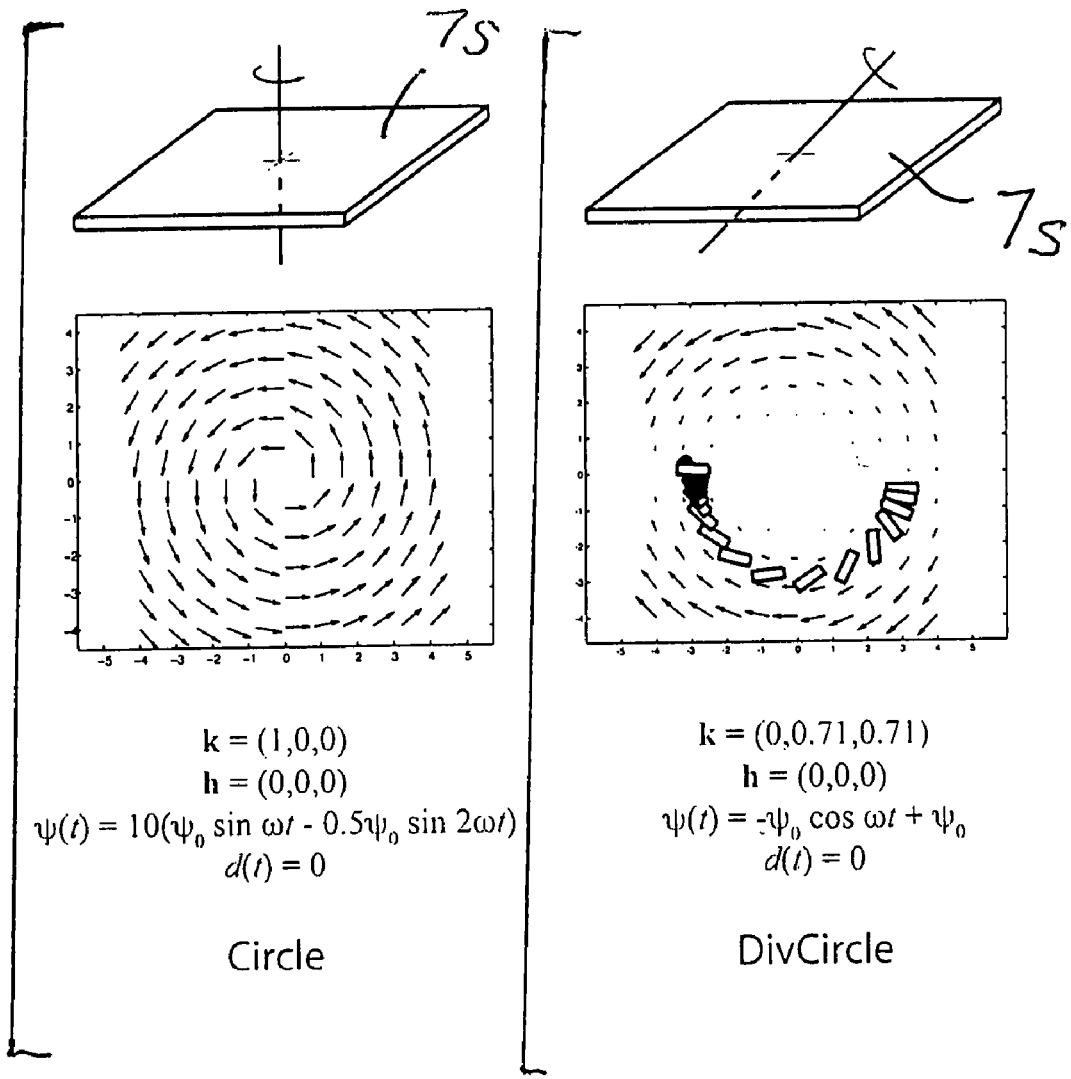

FIGS. 5A through 5H illustrate eight different screw motions and the force fields they generate (as indicated by simulations) on a flat horizontal plate. FIG. 5A illustrates the "LineSink" arising from sinusoidal rotation about an axis below the plate, as described earlier pursuant to an embodiment of the invention. The motion of a part on the plate is simulated. This linear sink produces article motion on the surface directly toward a particular linear axis. FIG. 5B shows a "LineSource" created by sinusoidal rotation about an axis above the plate pursuant to an embodiment of the invention. This linear source produces article motion on the surface directly away from a particular linear axis. That is, parts are forced away from the center line, rather than drawn to it. FIG. 5C shows a "SkewLineSink" created by rotating about an axis below the plate while sinusoidally translating the plate along the axis pursuant to an embodiment of the invention. This skewed line sink produces part motion on the surface toward a particular linear axis wherein the article motion is not perpendicular to the axis. FIG. 5D shows a "SkewLineSource" similar to the "SkewLineSink" but using an axis above the plate pursuant to an embodiment of the invention. This skewed line source produces article motion on the surface away from a particular linear axis wherein the article motion is not perpendicular to the axis. FIG. 5E shows a "Trans" force field created by translating the plate along a horizontal direction with an asymmetric motion. FIG. 5F shows a "ScaledCircle" force field created by asymmetric rotation about a vertical axis. Forces increase with distance from the center of the circle. The "Circle" force field of FIG. 5G is similar, except the higher speed of the plate nearly erases the force magnitude's dependence on the distance from the center of the circle. The force fields of FIGS. 5E, 5F, and 5G are generated by in-plane vibratory translation or rotation motion not pursuant to the invention. The "DivCircle" force field of FIG. 5H arises from sinusoidal rotation about an axis that intersects the plate at 45 degrees with respect to the gravity vector pursuant to an embodiment of the invention. This friction force field produces an article motion on the surface in circular trajectories about a fixed point, wherein article motion on one side of a fixed linear axis is in a clockwise direction while article motion on the other side is in counter-clockwise direction. Parts diverge from a half-line below the axis where it is above the plate and converge to a half-line above the axis where it is below the plate. In the above description, it will be appreciated that the linear axis, points, and locations are referred to for purposes of illustation and not limitation since the linear axis, points, and locations can be disposed at any position relative to the support surface 7s and are not limited to being on the surface or at any particular position on the support surface. In all simulations used to create these force fields, $\omega=209$ rad/s, $\psi_0=0.005$ radians (0.29 degrees), and $d_0=0.05$ cm (50 microns).

For the purpose of discussion, we call the force fields in FIGS. 5A-5H "motion primitives." Closed-form approximations of the force fields in FIGS. 5A-5H can be generated from the simulation data as shown in Table I, where a and b are scaling constants with a, b>0.

TABLE I

APPROXIMATE FORCE FIELD REPRESENTATIONS OF MOTION PRIMITIVES

| Figure | Name | Approximate Force Field |
|---|---|---|
| 5A | LineSink | $f(x, y) \approx a(-x, 0)$ |
| 5B | LineSource | $f(x, y) \approx a(x, 0)$ |
| 5C | SkewLineSink | $f(x, y) \approx (-ax, -bx)$ |
| 5D | SkewLineSource | $f(x, y) \approx (ax, -bx)$ |
| 5E | Trans | $f(x, y) \approx a(1, 0)$ |
| 5F | ScaledCircle | $f(x, y) \approx a(-y, x)$ |
| 5G | Circle | $f(x, y) \approx a(-y, x)/(y^2 + x^2)^{1/2}$ |
| 5H | DivCircle | $f(x, y) \approx (-ay^2, bxy)$ |

The motion primitives (basic force fields) in FIGS. 5A through 5H can be modified by changing the parameters. For example, the centers of circles can be moved and the source and sink lines moved and rotated. These features may be moved outside (off) the surface of the support member.

A further embodiment of the present invention envisions combining two or more motion primitives (basic force fields) to create a large family of useful force fields. For example, the motion primitives can be concatenated in time, provided the surface trajectories at the points of "gluing" (where one field is switched to the next) have continuous velocities. The result of rapid switching between force fields is that parts will experience a net force field that is approximately the time-average of the constituent force fields. This allows creation of time-averaged force fields that are linear combinations of the primitive fields. Example combined force fields are shown in FIG. 6A-6H. FIG. 6A shows a "Sink" field, which is a combination of two orthogonal "LineSink" fields. A "Sink" field produces article motion on the support surface toward a particular position thereon and can be used to uniquely position and orient a part without sensor feedback (up to symmetry in the part). FIG. 6B shows a "Source" field created from two "LineSource" fields. This source field produces part motion on the surface away from a particular position thereon. FIG. 6C shows a "Saddle" field created from a "LineSource" and a "LineSink". This saddle-shaped sliding friction force field produces article motion on the surface toward one linear axis and away from another linear axis. FIG. 6D shows a "Jet" field created from two "Circle" fields. FIG. 6E shows a "Whirlpool" created from a "Sink" and a "Circle," and 6F shows a "SpiralOut" field created from a "Source" and a "Circle". The whirlpool (spiral-in) sliding friction force field produces article motion on the surface along a spiral trajectory converging to a point. The spiral-out sliding friction force field produces article motion on the surface along a spiral trajectory diverging from a point. FIG. 6G shows a "DivergeTrans" field created from a "LineSource" and a "Trans." This sliding friction force field produces article motion on the surface that is a sum of motion away from a linear axis and a motion in the direction of the same linear axis. Parts are transported and separated about a center line. A "Squeeze-Trans" field is created from a "LineSink" and a "Trans" in FIG. 6H. This sliding friction force field produces article motion on the surface that is a sum of motion toward a linear axis and a motion in the direction of the same linear axis. Parts are transported and squeezed to the center as they move, aligning with the center line. This field may be useful for simultaneous transport and orienting of parts.

The time-averaged fields in FIGS. 5A-5H and 6A-6H are examples of a much broader class of effective force fields that can be created by vibration of a support surface with up to six degrees of freedom. Of the fields shown in these figures, only the fields of FIGS. 5E, 5G, and 6D have been disclosed heretofore; e.g. by Reznik and Canny in "A flat rigid plate is a universal planar manipulator," IEEE International Conference on Robotics and Automation, pages 1471-1477, 1998; "C'mon part, do the local motion!," IEEE International Conference on Robotics and Automation, pages 2235-2242, 2001; and "Building a universal manipulator," Distributed Manipulation, pages 147-171, Kluwer Academic Publishers, 2000. This work of Reznik and Canny does not allow roll or pitch of a part support surface; in other words, it does not use position-dependent effective gravity in accordance with embodiments of the invention. This limitation of their work, together with the assumption of that work that parts never stick to the part support surface (this assumption is sometimes violated in practice), restricts the force fields f to be "divergence free." Mathematically, this is written $\nabla \cdot f = 0$, and it means that the flow into any closed region of the plane is equal to the flow out of it. As an example, the flow of incompressible fluid is divergence free: the rate at which new fluid enters a region is equal to the rate at which fluid is pushed out of that region. This restriction on the force fields precludes sources (where there is a positive flow away from the source, $\nabla \cdot f > 0$), sinks (negative flow away from the sink, i.e., flow into the sink, $\nabla \cdot f < 0$), whirlpools, etc.

As shown, illustrative embodiments of the invention can provide negative divergence in FIGS. 5A, 5C, 5H, 6A, 6E, and 6H and allow sensorless reduction of the configuration uncertainty of parts, as negative divergence has the inherent property of causing large regions of space to flow into smaller ones. The use of roll and/or pitch, and the resulting position-dependent effective gravity, is a feature of embodiments of the present invention for generating such force fields.

With a suitable set of motion primitives, designsing a particular time-averaged force field can reduce to finding an appropriate sequence of motion primitives. A sequence of primitives can be found by solving an optimization problem to find the set of primitives whose time-average will best approximate the desired field. In an alternative embodiment, the invention envisions two or more motion primitives being executed concurrently with programmable magnitude and phasing so that the collective motion comprises the sum of individual motions.

A general device implementing the methods of this section will have a support surface with six degrees of freedom of motion, allowing it to switch under computer control among all of the force fields discussed. However, devices with one to five degrees of freedom of control can implement a subset of the full family of force fields. A device can also be built to implement a single force field for fixed automation purposes, such as the "SqueezeTrans" field of FIG. 6H for parts transport and alignment. Such a device can operate without any programmability or computer control. Further implementations are discussed in Apparatus below.

The above-described methods for creating frictional force fields are most effective for moderate friction values between the parts and the vibrating part supporting surface, so that there is enough friction to generate controllable frictional force fields but not so much that parts always remain stuck to the surface as it vibrates.

Impact-Based Manipulation

The previous description has discussed sliding manipulation of parts in the plane of the support surface. However, parts on the surface may also tip over or impact with the vibrating support surface. In particular, if the surface is moving with nonzero pitch or roll, at some parts of the surface the effective gravity may reach zero. (For example, in the rotating elevator example of FIG. 2, person 1 will lose contact with the floor if either the rotational acceleration of the floor is large, or if person 1 is sufficiently left of the rotation axis.) After a period of free-fall, the cyclical motion of the support surface will cause it to re-establish contact with the part through impact. Such impacts can be useful in controlling the configuration of a part, potentially allowing control of up to all six degrees of freedom of rigid parts. Therefore, a further embodiment of the invention is directed toward using impact-based manipulation of parts by a vibratory surface moving with nonzero pitch or roll.

One application uses impacts with the vibrating support surface to drive a part to a known spatial position and orientation on a flat plate without any sensory feedback. The motion of the surface creates "hot" and "cold" zones in the part's configuration space, creating a virtual potential energy well to attract and trap the part to a particular configuration or set of configurations. This allows the possibility of both in-plane (of the support surface) and out-of-plane manipulation of parts. Virtual wells can be programmed by changing the motion of the surface.

This embodiment of the invention is now described for purposes of illustration and not limitation. Treating the part support member (a flat plate) as frictionless and the part as a point mass with a fixed pre-impact velocity, the maximum energy that can be added to the part at impact is determined by the maximum upward normal velocity of the plate over a cycle at the impact point on the part support plate. As an example, consider a fixed axis of rotation in the plane of the part support plate. The plate rotates about that axis at high speed in one direction to maximum amplitude, then rotates relatively slowly back to horizontal. This asymmetric driving creates a high maximum upward velocity on one side of the axis and a low maximum upward velocity on the other side of the axis as illustrated in FIGS. 7A-7C.

Figure 7A:
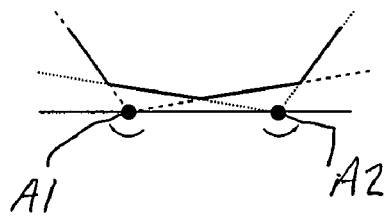
FIGS. 7A, 7B, and 7C are schematic views showing virtual potential wells that can be generated on the part support surface by vibratory motion thereof.
Figure 7B:
Figure 7C:
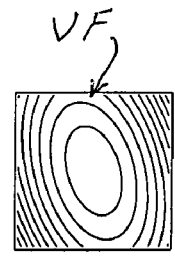

FIG. 7A is a side view of a part support plate that rotates quickly clockwise about the axis A1 on the left and then slowly counterclockwise back to rest, creating the dashed maximum-upward-velocity profile VF. The process of rotation is reversed for the axis A2 on the right, creating the dotted maximum-upward-velocity profile. The maximum of the two gives the maximum upward velocity as a function of the position. FIG. 7B provides a side view of an asymmetric bowl-shaped maximum-upward-velocity profile in the plane, and FIG. 7C is a contour plot of a top view of an example bowl-shaped maximum-upward-velocity profile VF on a horizontal plate.

By concatenating motions about multiple axes, the maximum upward velocity $v_{up}$, as a function of the position on the plate x, forms a convex bowl. It can be shown that theoretically any convex bowl of maximum upward velocities can be generated, perhaps by smoothly moving the rotation axes, provided $v_{up}(x)$ satisfies $v_{up}(x) > 0$ for all x, $\partial v_{up}/\partial x \neq 0$ everywhere (the function is not "flat"), and $\partial^2 v_{up}/\partial x^2$ is positive semidefinite everywhere (the function is convex). A rigid plate is not capable of implementing more than one $v_{up}(x)$ bowl on the plate at a time; this becomes possible when the plate is flexible, which may be considered within the scope of this embodiment.

A maximum-upward-velocity bowl $v_{up}(x)$ can be viewed as a stochastic approximation to a potential energy well. At positions x where $v_{up}$ is large, a part is likely to receive significant kinetic energy at impact, randomizing its configuration. At positions x where $v_{up}(x)$ is small, the part is likely to receive a gentle impact, changing its configuration little. Thus the part is likely to be found in a region of the plate where $v_{up}(x)$ is small. Moreover, the three-dimensional orientation of the part may also be sensitive to the shape of the $v_{up}(x)$ bowl, meaning that the part may be oriented by the surface's vibration. As an example, by choosing the sides of the $v_{up}(x)$ bowl to be steep and the center of the bowl to be relatively low and flat, a rectangular part may actually prefer to "stand up" in the field, rather than to lie down. This is because the part lying down is subject to large maximum impact velocities, while the part standing up is subject to more gentle impacts. The 2DOF and 3DOF apparatus described below, in both simulation and experiment, can produce "stand up" behavior in a small plastic rectangle (part).

The description above focuses on a support surface which is a flat plate, but the surface may be augmented with fixtures, templates, cavities, etc. These geometric features alter the effective potential wells created by vibratory motion, and may be particularly useful in facilitating the unique positioning and orientation of parts.

Apparatus

The invention provides a support surface 7s to be vibrated at relatively high frequency (typically tens of Hz or higher) with small amplitudes (typically translational motion of millimeters down to microns or less, and typically rotation on the order of one degree or less) for purposes of illustration and not limitation. The vibratory motion includes nonzero roll or pitch. Such motion can be achieved in a variety of ways. Preferred embodiments of the invention are discussed below. These embodiments use flat rigid plates as vibrating surfaces and are actuated by linear voice coil actuators. Those skilled in the art will recognize that the actuators could be rotational voice coils, piezoelectric, pneumatic, or other electromagnetic actuators, arranged in different topologies, while retaining the spirit of the invention. The flat support surfaces can be replaced by support surfaces with different geometries.

6DOF Method and Apparatus

The most general embodiment of this invention uses a six-degree-of-freedom (6DOF) vibratory support surface to be able to generate all frictional force fields f and maximum-upward-velocity bowls $v_{up}(x)$ described above.

A general 6DOF device will typically be a "parallel" mechanism, although practice of the invention is not limited to any particular type of 6DOF apparatus. In a parallel mechanism, multiple actuators are directly attached from the ground (or base) to the output stage, or platform, through linkages. This is as opposed to a "serial" mechanism, where there is one path from ground to the end-effector through a series of joints. Parallel mechanisms achieve a much higher endpoint stiffness than serial mechanisms, typically at the cost of a smaller workspace. Because the vibratory motions practiced by the invention are low amplitude (typically on the order of millimeters or microns in translation and a degree or less in rotation), a large workspace is not necessary.

A 6-DOF parallel mechanism, or "platform," is actuated by six or more linear or rotary actuators. A 6-DOF platform can be realized in a number of ways. Examples include a well-known class of parallel mechanisms known as "Stewart-Gough platforms" as well as the related parallel mechanism of Merlet described in U.S. Pat. No. 5,053,687. These devices use six linear actuators and a number of joints to drive a platform with limited motion in all of x-y-z-roll-pitch-yaw.

Joints (such as the universal joints and ball-and-socket joints of the Merlet platform) have some tolerance or "play" between the sliding or rolling surfaces. Even if this tolerance is small, it is usually large enough to negatively impact the control of vibratory displacements on the order of microns. For this reason, a preferred embodiment of a 6DOF platform mechanism for use in practice of the invention uses flexible, compliant joints instead of typical joints based on bearings. A compliant joint is made of flexible material, such as rubber, plastic, or thin metal, and is designed for small-amplitude motions with a specified stiffness and damping determined by material properties and the shaping of the material. Control of the vibratory motion of the platform is greatly simplified by the use of compliant joints. Mechanisms making use of compliant joints are called "compliant mechanisms"; see, for example, the book "Compliant Mechanisms," L. L. Howell, John Wiley and Sons, Inc., 2001, ISBN 0-471-38478-X, the teachings of which are incorporated herein by reference. Compliant flexure joints of flexible plastic shaped to allow the necessary small-displacement spherical joint motion are also described in the work of Kota et al. "Toplogical synthesis of compliant mechanisms using linear beam elements," *Mechanics and Structures of Machines*, 28(4): 245-280, 2000, and "Design and application of compliant mechanisms for surgical tools," *Journal of Biomechanical Engineering*, 127(6): 981-989, 2005, the teachings of which are incorporated herein by reference.

An alternative to mechanical platform mechanisms for practicing the invention comprises the 6DOF electromagnetic levitation wrist of Hollis described in U.S. Pat. No. 4,874,998. This device has only one moving part, the platform itself (called the "flotor"), which is controlled by electromagnetic forces created by controlled electric currents.

Figure 8:
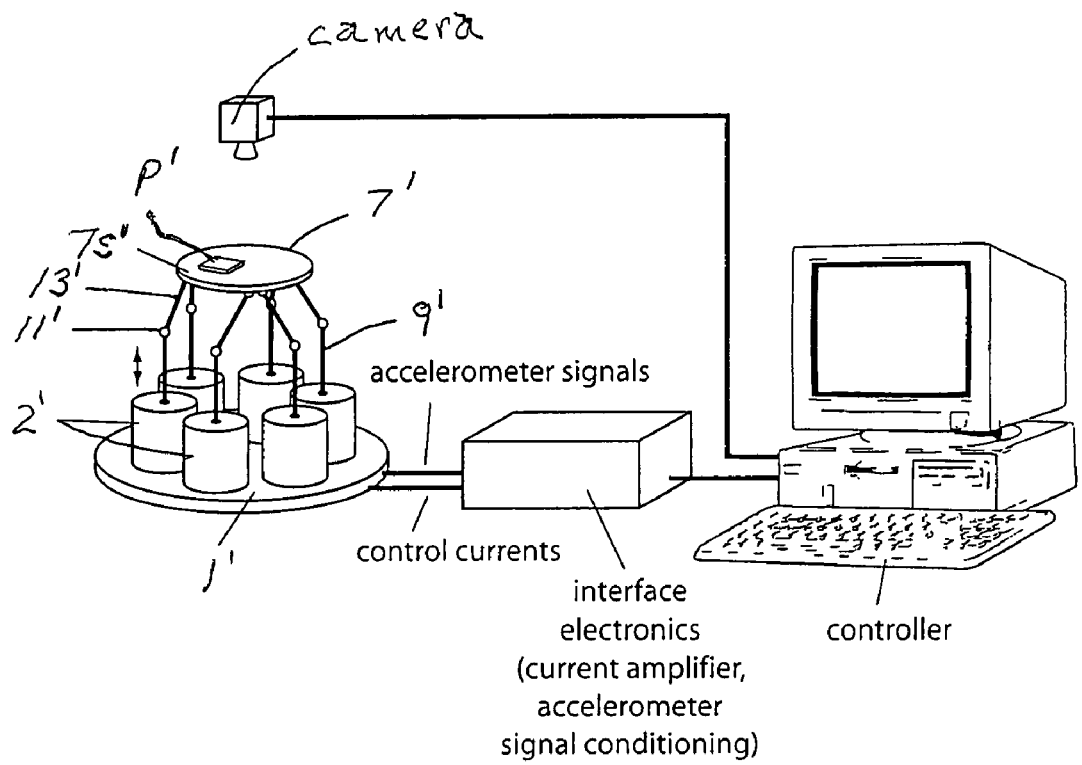
FIG. 8 illustrates an apparatus having six degrees of freedom for practicing an embodiment of the invention.

An illustrative 6DOF apparatus (FIG. 8) was constructed that exhibits maximum linear acceleration in excess of 5 g's, a workspace envelope of approximately 1 cm in each linear direction and 1 degree in each angular direction, and a frequency response in excess of 50 Hz. Referring to FIG. 8, this embodiment uses a 6DOF platform (part support member) 7' similar to the type described in the Merlet U.S. Pat. No. 5,053,687. Six linear voice coil actuators 2' are mounted to a base plate 1' through damper elements (not shown) to minimize forces transmitted between actuators 2' through the base plate 1'. The voice coils 2' are driven by electric currents, which are commanded by a controller (such as a personal computer with an appropriate control card) and amplified by interface electronics. The force created by each voice coil actuator 2' is transmitted to the rigid support plate 7' through a rigid link 9', to a compliant joint 11', to a second rigid link 13', and to a final compliant joint 15' attached to the part support plate 7'. The locations of the linear actuators, the link lengths, the compliant joints, and the attachment points to the rigid plate are chosen to allow sufficient motion in each of x-y-z-roll-pitch-yaw (see FIG. 1 and Merlet U.S. Pat. No. 5,053,687 for a better understanding of how the six linear actuators create 6DOF motion of the platform). The rigid part support plate 7' is made of a stiff, lightweight material, such as aluminum honeycomb, to prevent flexural modes. The part support plate 7' may be additionally supported by other compliant elements attached to ground (not shown in FIG. 8), so that the actuators 2' bear zero load when the part support plate is at rest.

Figure 9:
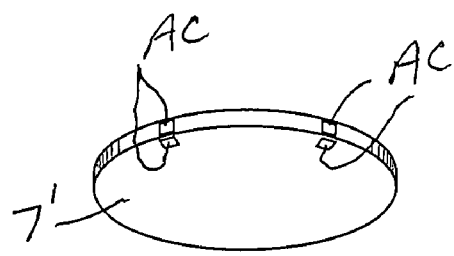
FIG. 9 illustrates an embodiment of the invention where two 2-axis accelerometers are placed on the underside of the support plate and two 2-axis accelerometers are placed on the side of the support plate.

The part support plate 7' is instrumented with accelerometers that measure all six accelerations (x-y-z-roll-pitch-yaw) of the plate. An example embodiment is shown in FIG. 9, where two 2-axis accelerometers AC are placed on the underside of the plate 7', and two 2-axis accelerometers AC are placed on the side of the plate 7'. Using appropriate mathematical transformations, the eight readings of the accelerometers AC provide redundant measurement of the six accelerations of the plate 7' at any instant. The invention is not limited to this sensor layout; any set of accelerometer configurations that uniquely determine plate acceleration is sufficient. Accelerometer readings are sent to the controller through appropriate amplifying interface electronics shown in FIG. 8. The interface electronics typically comprise voltage amplifiers that amplify the small analog voltage readings from the accelerometers. These amplified voltages are typically read by analog-to-digital converters in the controller.

Optionally, each linear actuator 2' can also be outfitted with an accelerometer (not shown), for further feedback on the operation of the system. Additionally, one or more optional vision sensors (cameras) shown in FIG. 8 may send images of one or more parts P' on the plate 7' to the controller.

Figure 10A:
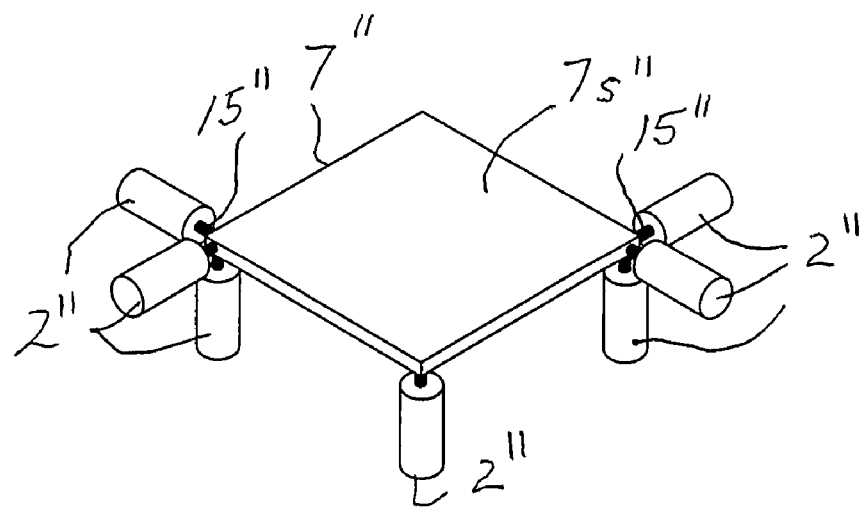
FIG. 10A illustrates another embodiment of the invention having eight linear actuators, four in the horizontal plane and four acting in the vertical direction. All actuators are attached to the support plate by a compliant element.
Figure 10B:
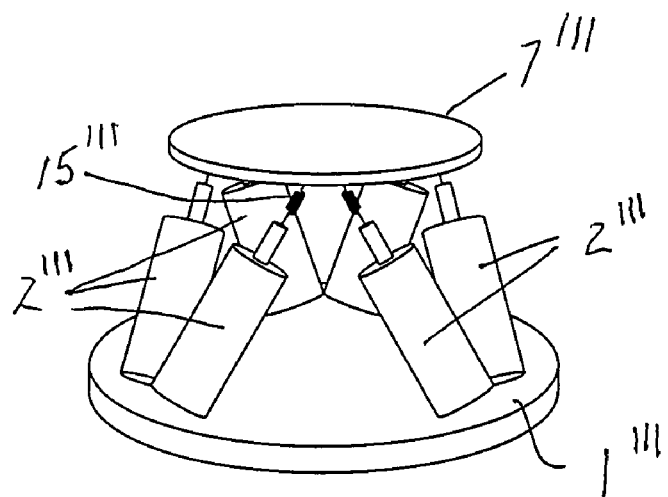
FIG. 10B illustrates another embodiment of the invention having three pairs of two linear actuators. All actuators are attached to the support plate by a compliant element.

FIG. 10A shows another possible embodiment of a parallel mechanism for a 6DOF apparatus having eight linear actuators 2" connected to and imparting motion to the part support plate 7", four actuators acting in the horizontal plane and four actuators acting in the vertical direction. All are attached to the plate 7" by a compliant element 15". FIG. 10B shows another embodiment of a parallel mechanism for a 6DOF apparatus similar to a Stewart-Gough platform. Three pairs of two linear acutators 2''' are rigidly attached to the base plate 1''' and compliantly by elements 15''' to support plate 7''' having support surface 7s'''. Many other mechanism topologies are possible, provided the actuators can exert forces and torques on the support plate in arbitrary directions at any time.

In the above embodiments, the support plate may additionally be excited by a higher frequency, lower amplitude vibration uncorrelated to the controlled acceleration of the plate. The purpose of this vibration is to encourage continued mobility of parts where sliding friction force fields become small, for example, near a Sink or LineSink force field described above. Such uncorrelated high frequency vibration may decrease the size of any "dead zones" that may form near a sink. This extra vibration may be always on, always off, or turned on and off under computer control. This vibration can be achieved by actuators similar to pager motors, among other possibilities.

Figure 11:
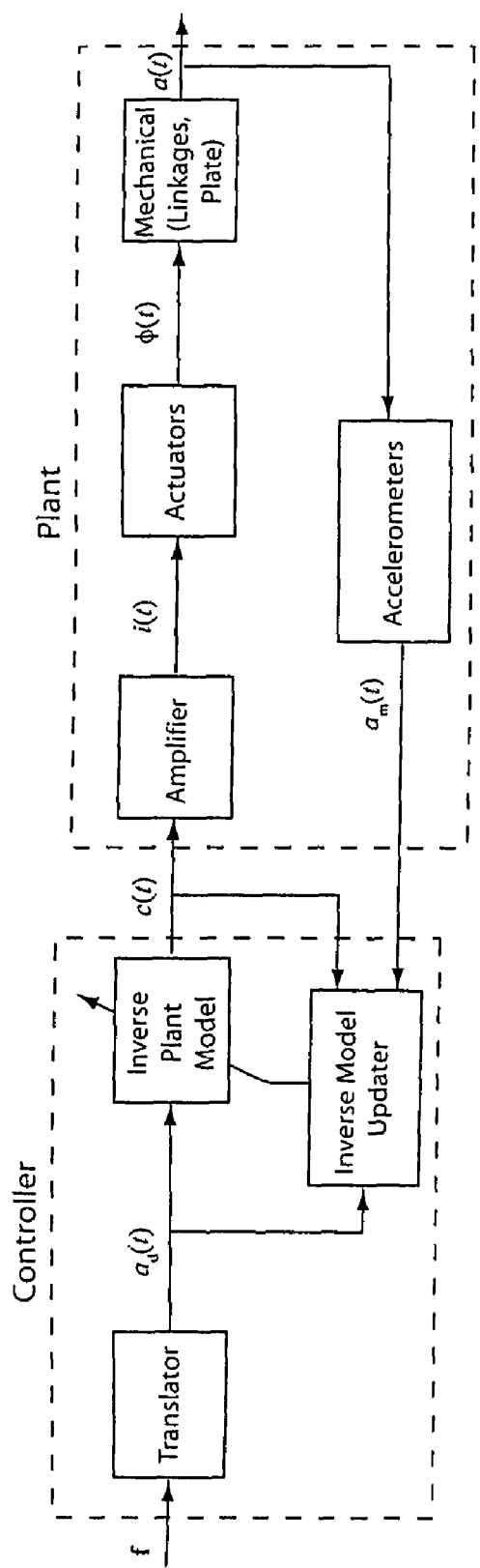
FIG. 11 is a diagrammatic of a control system where a desired force field, f, is specified by the user, the task, or a separate feedback controller based on vision data. A translator device turns this force field into a desired periodic vibration profile (acceleration profile) of the support plate, $a_d(t)$. This periodic acceleration is tuned into control signals c(t) sent to the current amplifier based on an inverse dynamic model of the electromechanical system. The amplifier sends currents i(t) to the linear actuators which convert the currents to forces $\phi(t)$. These forces are transmitted to the support plate, causing actual accelerations a(t). These accelerations are measured by accelerometers, producing the measured signals $a_m(t)$. The controller may use learning control or system identification to update the inverse dynamic model to better achieve the desired acceleration.

FIG. 11 is a schematic of a typical control system for use with the apparatus of FIG. 8 or other apparatus. A desired force field f is specified by the user, the task, or a separate feedback controller based on vision data. For example, a force field corresponding to one or a combination of two or more primitive force fields described above as well as others not described can be specified by the user, the task, or a separate feedback controller based on vision data to the Controller shown. Real-time vision feedback may be used when controlling the motions of individual parts along independent trajectories. This is done by choosing force fields with forces in desired directions at the location of each part.

The Controller includes a translator that turns the desired force field or maximum-upward-velocity bowl into a desired periodic vibration profile (acceleration profile) of the plate, $a_d(t)$. The translator may use combinations or sequences of motion primitives, as described above, to achieve a periodic motion approximating the desired force field or maximum-upward-velocity bowl. The desired periodic acceleration $a_d(t)$ is turned into control signals c(t) sent to the current amplifier (Amplifier) based on an Inverse Plant Model of the electromechanical system of the apparatus (the Plant). The Inverse Plant Model of the electromechanical system may comprise a fit to the inverse dynamics of the Plant based on standard linear system input-output system identification techniques. (A linear dynamics model is appropriate due to the small displacement and velocities of the device.) This allows rough identification of an Inverse Plant Model. The Inverse Plant Model accepts a desired trajectory $a_d(t)$ as input and produces a command c(t) which should approximately yield the desired trajectory. To achieve even more precise tracking of a particular trajectory of the part support surface, the Inverse Plant Model may also make use of an Iterative Learning Controller. An Iterative Learning Controller incrementally adjusts the control c(t) over consecutive cycles so that the error $e(t)=a_d(t)-a_m(t)$ approaches zero in later cycles. Iterative Learning Control is further discussed in publications such as "Iterative Learning Control for Deterministic Systems," K. L. Moore, Springer-Verlag, 1993. For purposes of illustration and not limitation, the Controller may comprise one or more analog I/O cards on a personal computer running a real-time control system, for example, Matlab xPC at 10 kHz.

The amplifier sends currents i(t) to the linear actuators 2' which convert the currents to forces ϕ(t). These forces are transmitted through the linkages to the plate, causing an actual plate acceleration a(t). These accelerations are measured by accelerometers AC, producing the measured signals $a_m(t)$.

This same control scheme was applied to the 1DOF, 2DOF, and 3DOF mechanisms described below.

Applications

There are many potential applications for a 6DOF vibratory surface employing nonzero roll or pitch for the purposes of sliding-based or impact-based manipulation of parts. Bulk small parts or granular material can be driven along nonzero-divergence programmable vector fields. The flow of parts can be directed according to the supply needs of downstream manufacturing stations. A "SqueezeTrans" field can be used to simultaneously transport parts and align them for the next manufacturing operation. With computer vision feedback, multiple parts can be transported simultaneously along specified independent trajectories by frictional force fields. Multiple parts can be driven together in negative divergence force fields to form desired planar arrangements. Planar assemblies can be "squeezed" together as they are transported. Single parts can have their position and orientation uncertainty completely eliminated without sensor feedback by the use of "Sink" frictional force fields, or by sequences of "LineSink" and "Sink" fields, or by virtual potential wells in impact-based manipulation. Parts with different sizes or friction coefficients can be sensorlessly sorted into different bins, based on the different total forces and torques they experience when in contact with the same vibrating plate. A worksurface, centrally placed between multiple manufacturing stations, can shuttle parts between the workstations as necessary by changing the vibration profile.

While the 6DOF device offers all of these capabilities, devices with fewer controlled degrees of freedom have a subset of these capabilities. Three lower-degree-of-freedom apparatus are described below.

2DOF Method and Apparatus

FIGS. 12A1, 12A2 involve four linear actuators (three shown) connected by compliant elements 15" to a flat support plate 7" and a side view (FIG. 12A2) of a planar two-actuator (2DOF) approximation obtained when pairs of actuators 2" are controlled identically. FIGS. 12B1, 12C1, and 12D1 show possible alternate orientations of the linear actuators. These different orientations can be used for different purposes. In FIG. 12B1, the two actuators are tilted identically and execute identical oscillatory motions of the same phase and equal amplitude. The result is a "Trans" frictional force field, FIG. 12B2, transporting parts to the right on the plate. In FIG. 12C1, the actuators are pointed inward and oscillate 180 degrees out of phase. If the oscillations are equal amplitude, the plate approximately rotates about an axis below the center of the plate, and a "LineSink" force field, FIG. 12C2, is created centered on the plate. If the left actuator oscillates with smaller amplitude, the rotation axis (and the sink line) moves closer to that actuator, FIG. 12C3. Thus the location of the sink line can be moved by changing the amplitude of oscillation under computer control. Similarly, in FIG. 12D1, the actuators are pointed outward and oscillate 180 degrees out of phase. If the oscillations are equal amplitude, the plate approximately rotates about an axis above the center of the plate, and a "LineSource" field is created as shown in FIG. 12D2. The location of the source line depends on the relative amplitude of oscillation as illustrated in FIG. 12D3, where the left actuator oscillates with a smaller amplitude.

FIGS. 12A1 through 12D1 and the resulting force fields indicate how a 2DOF mechanism can implement a subset of the described frictional force fields. It can also be used to create $v_{up}(x)$ bowls for manipulation in a vertical plane. The plate may be tilted in gravity to add a linear component to a frictional force field.

3DOF Method and Apparatus

Figure 13:
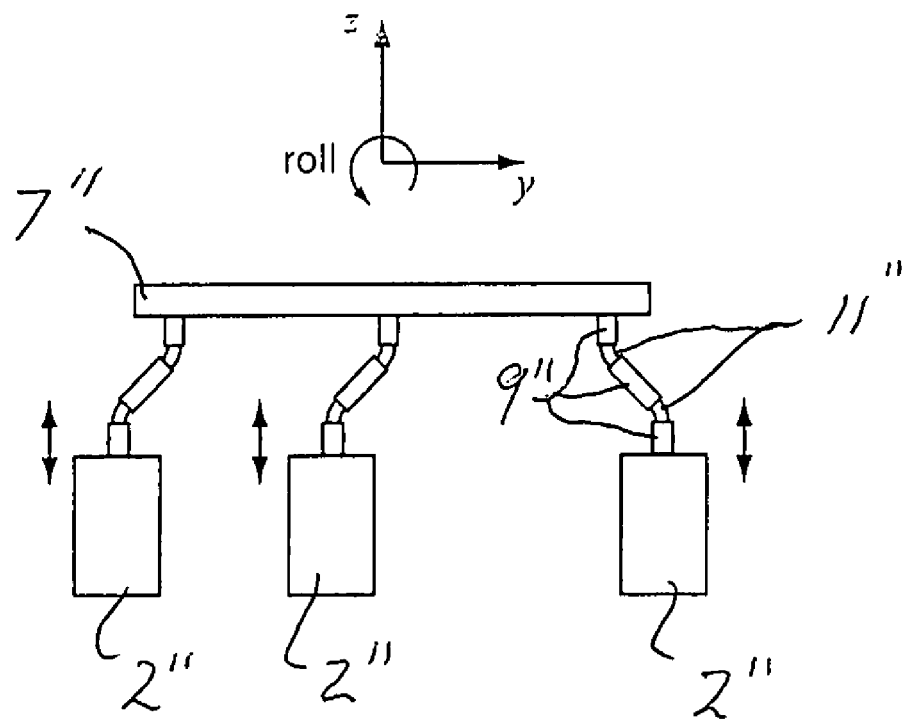
FIG. 13 illustrates an embodiment of the invention using three linear actuators to create support plate motion in the y, z, and roll directions.

A 3DOF parallel mechanism can be constructed using three linear actuators as shown in the side view in FIG. 13. The three linear actuators 2" control the y and z linear motion of the plate 7" as well as the roll of the plate (the three degrees of freedom of motion in a vertical plane). In this embodiment, each actuator 2" is attached to the plate 7" through a linkage containing two compliant elements 11" and rigid links 9", each compliant element acting as a compliant revolute joint. The 3DOF parallel apparatus has been used to generate the "LineSink" field in sliding-based manipulation as well as "stand up" behavior of a rectangular part in impact-based manipulation.

1DOF Method and Apparatus

The 1DOF mechanism was previously described and illustrated in FIGS. 4A, 4B.

Although certain illustrative embodiments of the invention have been described above, those skilled in the art will appreciate that changes, modifications and the like can be made therein without departing from the spirit and scope of the invention as set forth in the appended claims.

We claim:

1. A method of imparting movement to one or more articles, comprising:
    placing the one or more articles on a surface of a support member, and
    imparting vibratory motion to the support member, wherein the vibratory motion of the support member includes a time-varying roll component of motion and/or a time-varying pitch component of motion, and wherein the vibratory motion produces sliding on the surface having nonzero divergence.

2. The method of claim 1 wherein the one or more articles are disposed to substantially slide on the support member.

3. The method of claim 2 wherein the support member is a substantially rigid, horizontal flat plate.

4. The method of claim 1 wherein the support member is substantially rigid so as not to have flexural modes.

5. The method of claim 1 wherein the support member is a substantially rigid, flat plate oriented out of a horizontal plane.

6. The method of claim 1 further including imparting to the support member vibratory yaw rotation and/or translational motion in the x, y, and/or z directions.

7. The method of claim 1 wherein the vibratory motion of the support member comprises a sum of multiple primitive periodic motions, at least one of which includes the time-varying roll component of motion and/or the time-varying pitch component of motion.

8. The method of claim 1 wherein the vibratory motion of the support member comprises a sequence of primitive periodic motions, at least one of which includes the time-varying roll component of motion and/or the time-varying pitch component of motion.

9. The method of claim 1 used for positioning or orienting one or more articles on the surface, for sorting articles on the surface, for singulating articles on the surface, for mating articles on the surface, for conveying articles on the surface, and/or for conveying articles while orienting them on the surface.

10. The method of claim 1 further including providing optical, vision, accelerometer, or other sensor feedback to a controller.

11. The method of claim 1 wherein vibratory motion of the support member causes impacts with an article thereon, creating a virtual well on the support surface to capture an article in a particular position and/or orientation.

12. The method of claim 1 wherein the vibratory motion is imparted to the support member by oscillatory rotation thereof about a rotation axis below or above the support member to move the surface out of a generally horizontal plane.

13. The method of claim 1 wherein the vibratory rotation motion is imparted to the support member by oscillatory rotation thereof about a rotation axis intersecting the support member at less than 90 degrees.

14. The method of claim 1 further including superimposing a relatively higher frequency vibration to the support member to encourage mobility or prevent sticking of the one or more articles, in addition to applying a relatively lower frequency vibration to create conveyance of the articles.

15. The method of claim 1 wherein the vibratory motion produces an effective sliding friction force field or velocity field on the surface.

16. The method of claim 15 wherein the vibratory motion is imparted to produce article motion on the surface toward a particular position on the surface.

17. The method of claim 15 wherein the vibratory motion is imparted to produce article motion on the surface directly toward a particular linear axis.

18. The method of claim 15 wherein the vibratory motion is imparted to produce article motion on the surface toward a particular linear axis wherein the article motion is not perpendicular to the axis.

19. The method of claim 15 wherein the vibratory motion is imparted to produce article motion on the surface away from a particular position on the surface.

20. The method of claim 15 wherein the vibratory motion is imparted to produce article motion on the surface directly away from a particular linear axis.

21. The method of claim 15 wherein the vibratory motion is imparted to produce article motion on the surface away from a particular linear axis wherein the article motion is not perpendicular to the axis.

22. The method of claim 15 wherein the vibratory motion is imparted to produce article motion on the surface toward one linear axis and away from another linear axis.

23. The method of claim 15 wherein the vibratory motion is imparted to produce article motion on the surface in circular trajectories about a fixed point, wherein article motion on one side of a fixed linear axis is in a clockwise direction while article motion on the other side is in a counterclockwise direction.

24. The method of claim 15 wherein the vibratory motion is imparted to produce article motion on the surface along a spiral trajectory converging to a point.

25. The method of claim 15 wherein the vibratory motion is imparted to produce article motion on the surface along a spiral trajectory diverging from a point.

26. The method of claim 15 wherein the vibratory motion is imparted to produce article motion on the surface that is a sum of motion away from a linear axis and a motion in the direction of the same linear axis.

27. The method of claim 15 wherein the vibratory motion is imparted to produce article motion on the surface that is a sum of motion toward a linear axis and a motion in the direction of the same linear axis.

28. An apparatus for imparting movement to one or more articles, comprising: a support member having a surface on which the one or more articles are disposed,
    one or more actuator devices for imparting vibratory motion to the support member, wherein the vibratory motion includes a time-varying roll component of motion and/or a time-varying pitch component of motion, and
    a controller for providing electrical signals to the one or more actuator devices.

29. The apparatus of claim 28 wherein the support member has one to six degrees of freedom of motion.

30. The apparatus of claim 28 wherein the support member is substantially rigid so as not to have flexural modes.

31. The apparatus of claim 28 wherein the support member is a substantially rigid, horizontal flat plate on which the one or more articles are disposed to substantially slide.

32. The apparatus of claim 28 wherein the support member is a substantially rigid plate tilted in gravity.

33. The apparatus of claim 28 further comprising optical, vision, accelerometer, or other sensor feedback to a controller.

34. A method of imparting movement to one or more articles, comprising:
placing the one or more articles on a surface of a support member, and
imparting vibratory motion to the support member, wherein the vibratory motion includes a time-varying roll component of motion and/or a time-varying pitch component of motion and produces a sliding friction force field to produce article motion on the surface in circular trajectories about a fixed point, wherein article motion on one side of a fixed linear axis is in a clockwise direction while article motion on the other side is in a counterclockwise direction.

35. A method of imparting movement to one or more articles, comprising:
placing the one or more articles on a surface of a support member, and
imparting vibratory motion to the support member, wherein the vibratory motion of the support member comprises a sum of multiple primitive periodic motions, at least one of which includes a time-varying roll component of motion and/or a time-varying pitch component of motion, with programmable magnitudes and phasing of the primitive periodic motions.

36. A method of imparting movement to one or more articles, comprising:
placing the one or more articles on a surface of a support member, and
imparting vibratory motion to the support member, wherein the vibratory motion of the support member includes a time-varying roll component of motion and/or a time-varying pitch component of motion, and the vibratory motion of the support member further comprises a sequence of primitive periodic motions, at least one of which includes a time-varying roll component of motion and/or a time-varying pitch component of motion, each with a programmable magnitude.

37. An apparatus for imparting movement to one or more articles, comprising:
a support member having a surface on which the one or more articles are disposed, one or more actuator devices for imparting vibratory motion to the support member, wherein the vibratory motion includes a time-varying roll component of motion and/or a time-varying pitch component of motion, and
a controller for providing electrical signals to the one or more actuator devices, wherein a desired sliding friction force field, velocity field or virtual well is specified to the controller and the controller includes a translator that converts the desired sliding friction force field, velocity field or virtual well into a desired periodic vibration profile of the support member.

38. The apparatus of claim 37 wherein the translator determines a periodic motion approximating the desired force field, velocity field or virtual well and provides control signals to the one or more actuator devices.

39. The apparatus of claim 38 wherein the control signals are based on an inverse model of the dynamics of the apparatus and/or an iterative learning controller, to achieve precise control of the vibratory motion of the support member.

40. A method of imparting movement to one or more articles, comprising:
placing the one or more articles on a flat support surface of a rigid support member, and
imparting periodic vibrations to the support member, including a time-varying roll component of motion and/or a time-varying pitch component of motion of the support member, such that the one or more articles are transported by sliding having nonzero divergence.

\* \* \* \* \*

UNITED STATES PATENT AND TRADEMARK OFFICE
CERTIFICATE OF CORRECTION

| | |
|---|---|
| PATENT NO. | : 8,230,990 B2 |
| APPLICATION NO. | : 11/724607 |
| DATED | : July 31, 2012 |
| INVENTOR(S) | : Kevin Lynch et al. |

It is certified that error appears in the above-identified patent and that said Letters Patent is hereby corrected as shown below:

In the Specifications:

Column 4
Line 8, replace "tuned" with -- turned --.

Column 7
Line 48, replace "fields" with -- field --;
Line 49, replace "dervied" with -- derived --;
Line 59, replace "stero" with -- stereo --.

Column 9
Line 16, insert -- a -- before -- counter-clockwise --;
Line 21, replace "illustation" with -- illustration --;
Line 27, replace "(50 microns)" with -- (500 microns) --.

Column 10
Line 65, replace "designsing" with -- designing --.

Column 14
Line 64, insert -- the sink of -- after -- near --.

Signed and Sealed this
Thirtieth Day of April, 2013

Teresa Stanek Rea
*Acting Director of the United States Patent and Trademark Office*